(12) United States Patent
Park

(10) Patent No.: US 10,761,665 B2
(45) Date of Patent: Sep. 1, 2020

(54) DISPLAY DEVICE

(71) Applicant: SAMSUNG DISPLAY CO., LTD., Yongin-si, Gyeonggi-Do (KR)

(72) Inventor: Sunghyun Park, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/268,577

(22) Filed: Feb. 6, 2019

(65) Prior Publication Data

US 2019/0258338 A1 Aug. 22, 2019

(30) Foreign Application Priority Data

Feb. 22, 2018 (KR) ........................ 10-2018-0021158

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0443* (2019.05); *G06F 3/0446* (2019.05); *G06F 2203/04111* (2013.01); *G06F 2203/04112* (2013.01)

(58) Field of Classification Search
CPC .. G06F 2203/04111; G06F 2203/04112; G06F 3/044

See application file for complete search history.

(56) References Cited

U.S. PATENT DOCUMENTS

| | | |
|---|---|---|
| 9,239,654 B2 | 1/2016 | Jang |
| 9,703,424 B2 | 7/2017 | Kim et al. |
| 9,733,776 B2 | 8/2017 | Han et al. |
| 2017/0168608 A1 | 6/2017 | Kim et al. |
| 2017/0212629 A1* | 7/2017 | Cho ........................ G06F 3/044 |
| 2018/0190723 A1* | 7/2018 | Han ...................... H01L 27/323 |
| 2018/0348937 A1* | 12/2018 | Pak ....................... G06F 3/0412 |

FOREIGN PATENT DOCUMENTS

| | | |
|---|---|---|
| KR | 10-2016-0087046 | 7/2016 |
| KR | 10-1836232 | 3/2018 |

* cited by examiner

*Primary Examiner* — Koosha Sharifi-Tafreshi
(74) *Attorney, Agent, or Firm* — F. Chau & Associates, LLC

(57) ABSTRACT

A display device includes: a display panel including a substrate; and a touch sensing unit on the substrate, wherein the touch sensing unit includes: a plurality of first sensing electrodes disposed on the substrate and directly connected to each other; a plurality of second sensing electrodes disposed on the substrate; an insulating layer between the substrate and the first sensing electrodes and between the substrate and the second sensing electrodes; a connection electrode disposed between the substrate and the insulating layer, wherein the connection electrode is connected to at least one of the second sensing electrodes through a contact hole of the insulating layer; and a dummy electrode located on the same layer as the connection electrode, wherein the dummy electrode is not physically connected to the connection electrode and the first sensing electrodes.

27 Claims, 17 Drawing Sheets

DISPLAY DEVICE

CROSS-REFERENCE TO RELATED APPLICATION

This application claims priority under 35 U.S.C. § 119 to Korean Patent Application No. 10-2018-0021158, filed on Feb. 22, 2018, in the Korean Intellectual Property Office (KIPO), the disclosure of which is incorporated by reference herein in its entirety.

1. TECHNICAL FIELD

Exemplary embodiments of the present invention relate to a display device capable of minimizing short-circuit failure between sensing electrodes in a touch sensing unit.

2. DISCUSSION OF RELATED ART

In general, flat panel display (FPD) devices such as organic light emitting diode (OLED) display devices, liquid crystal display (LCD) devices, and electrophoretic display (EPD) devices include a display panel which includes an electric field generating electrode and an electro-optical active layer.

Such display devices may have a touch sensing function which enables interaction with users. The touch sensing function allows the display device, when the user touches a screen with a finger, a touch pen, or the like, to detect a change in pressure applied to the screen, or the like, and obtain touch information such as the touch location. The display device may receive image signals based on the touch information.

Such touch sensing function may be implemented by a touch sensing unit that includes a plurality of first sensing electrodes and a plurality of second sensing electrodes intersecting each other with an insulating layer interposed therebetween.

SUMMARY

According to an exemplary embodiment of the present invention, a display device includes: a display panel including a substrate; and a touch sensing unit on the substrate. The touch sensing unit includes: a plurality of first sensing electrodes disposed on the substrate and directly connected to each other; a plurality of second sensing electrodes disposed on the substrate; an insulating layer between the substrate and the first sensing electrodes and between the substrate and the second sensing electrodes; a connection electrode disposed between the substrate and the insulating layer, wherein the connection electrode is connected to at least one of the second sensing electrodes through a contact hole of the insulating layer; and a dummy electrode located on the same layer as the connection electrode, wherein the dummy electrode is not physically connected to the connection electrode and the first sensing electrodes.

The dummy electrode may be a floating electrode.

An end portion of the dummy electrode may face an end portion of the connection electrode.

The end portions of the dummy electrode and the connection electrode may have a rounded shape.

The end portions of the dummy electrode and the connection electrode may have a rounded shape protruding toward each other.

One of the end portions of the dummy electrode and the connection electrode may have a rounded shape protruding toward the other of the end portions, and the other of the end portions may have a concave shape.

The end portions of the dummy electrode and the connection electrode may have a concavo-convex shape.

The dummy electrode may be adjacent to the connection electrode.

The dummy electrode may be located between end portions of the connection electrode.

The dummy electrode may be located between adjacent second sensing electrodes.

End portions of the dummy electrode and the connection electrode may be located between one of the first sensing electrodes and one of the second sensing electrodes.

Other end portions of the dummy electrode and the connection electrode may be located in a hole of the one first sensing electrode.

The dummy electrode may overlap at least one of the plurality of first sensing electrodes.

The dummy electrode may not overlap the plurality of first sensing electrodes.

The dummy electrode may not be physically connected to the plurality of first sensing electrodes.

The dummy electrode may be connected to at least one of the plurality of first sensing electrodes.

The dummy electrode may have a non-continuous line shape.

The dummy electrode may include a plurality of dummy electrodes that are separated from each other.

A sensing line of one of the first sensing electrodes may be located between end portions of one of the plurality of dummy electrodes and the connection electrode.

The connection electrode may overlap a first sensing electrode and two second sensing electrodes that are adjacent to each other.

According to an exemplary embodiment of the present invention, a display device includes: a display panel including a substrate; and a touch sensing unit on the substrate. The touch sensing unit includes: a plurality of first sensing electrodes disposed on the substrate and directly connected to each other; a plurality of second sensing electrodes disposed on the substrate; an insulating layer between the substrate and the first sensing electrodes and between the substrate and the second sensing electrodes; a connection electrode disposed between the substrate and the insulating layer, wherein the connection electrode is connected to one of the second sensing electrodes through a first contact hole of the insulating layer, and connected to another one of the second sensing electrodes through a second contact hole of the insulating layer; and a dummy electrode located between a third contact hole and a fourth contact hole, wherein the third contact hole is connected to the first contact hole and the fourth contact hole is connected to the second contact hole, and wherein the dummy electrode has a non-continuous line shape.

According to an exemplary embodiment of the present invention, a display device includes: a display panel including a substrate; and a touch sensing unit on the substrate. The touch sensing unit includes: a plurality of first sensing electrodes disposed on the substrate and directly connected to each other; a plurality of second sensing electrodes disposed on the substrate; an insulating layer between the substrate and the first sensing electrodes and between the substrate and the second sensing electrodes; a connection electrode disposed between the substrate and the insulating layer, wherein the connection electrode is connected to adjacent second sensing electrodes through a contact hole of the insulating layer; and a dummy electrode located on the same layer as the first sensing electrodes, wherein the dummy electrode intersects the connection electrode, and is not physically connected to the first sensing electrodes and the second sensing electrodes.

The dummy electrode may be a floating electrode.

An end portion of the dummy electrode may face an end portion of the first sensing electrode.

The end portions of the dummy electrode and the first sensing electrode may have a rounded shape.

End portions of the dummy electrode and the connection electrode may have a rounded shape protruding toward each other.

First end portions of the dummy electrode and the connection electrode may have a rounded shape protruding toward second end portions of the dummy electrode and the connection electrode, and the second end portions may have a concave shape.

The end portions of the dummy electrode and the connection electrode may have a concavo-convex shape.

BRIEF DESCRIPTION OF THE DRAWINGS

The above and other features of the present invention will become more apparent by describing in detail exemplary embodiments thereof with reference to the accompanying drawings, wherein.

DETAILED DESCRIPTION OF THE EMBODIMENTS

Figure 1:
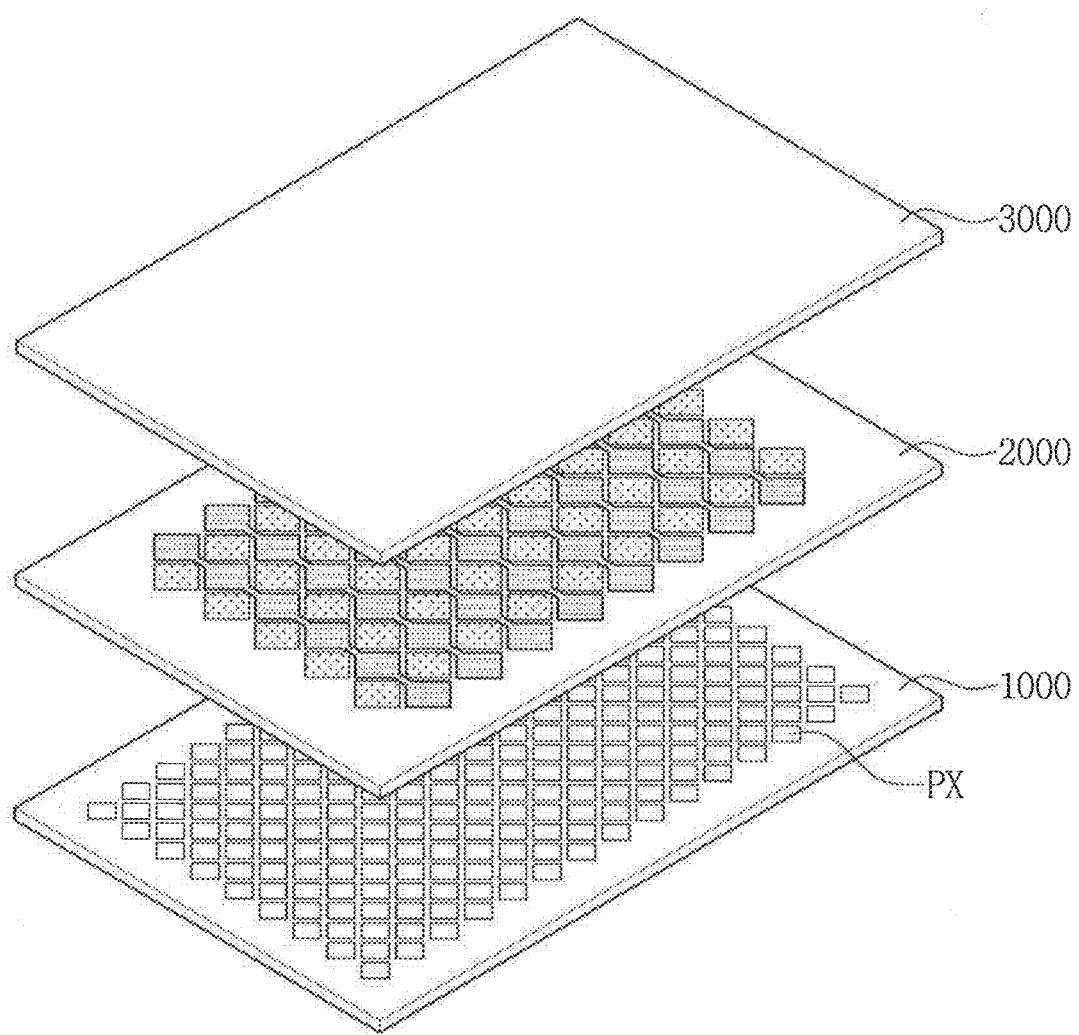
FIG. 1 is an exploded perspective view illustrating a display device according to an exemplary embodiment of the present invention.

Exemplary embodiments of the present invention will now be described more fully hereinafter with reference to the accompanying drawings. The present invention may, however, be embodied in many different forms and should not be construed as being limited to the exemplary embodiments set forth herein.

In the drawings, thicknesses of a plurality of layers and areas may be illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. In the drawings, like reference numerals may refer to like elements.

Throughout the specification, when an element is referred to as being "connected" to another element, the element may be "directly connected" to the other element, or "electrically connected" to the other element with one or more intervening elements interposed therebetween.

"About" or "approximately" as used herein may be inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Hereinafter, the display device according to an exemplary embodiment of the present invention will be described in detail with reference to FIGS. 1 to 20.

Figure 2:
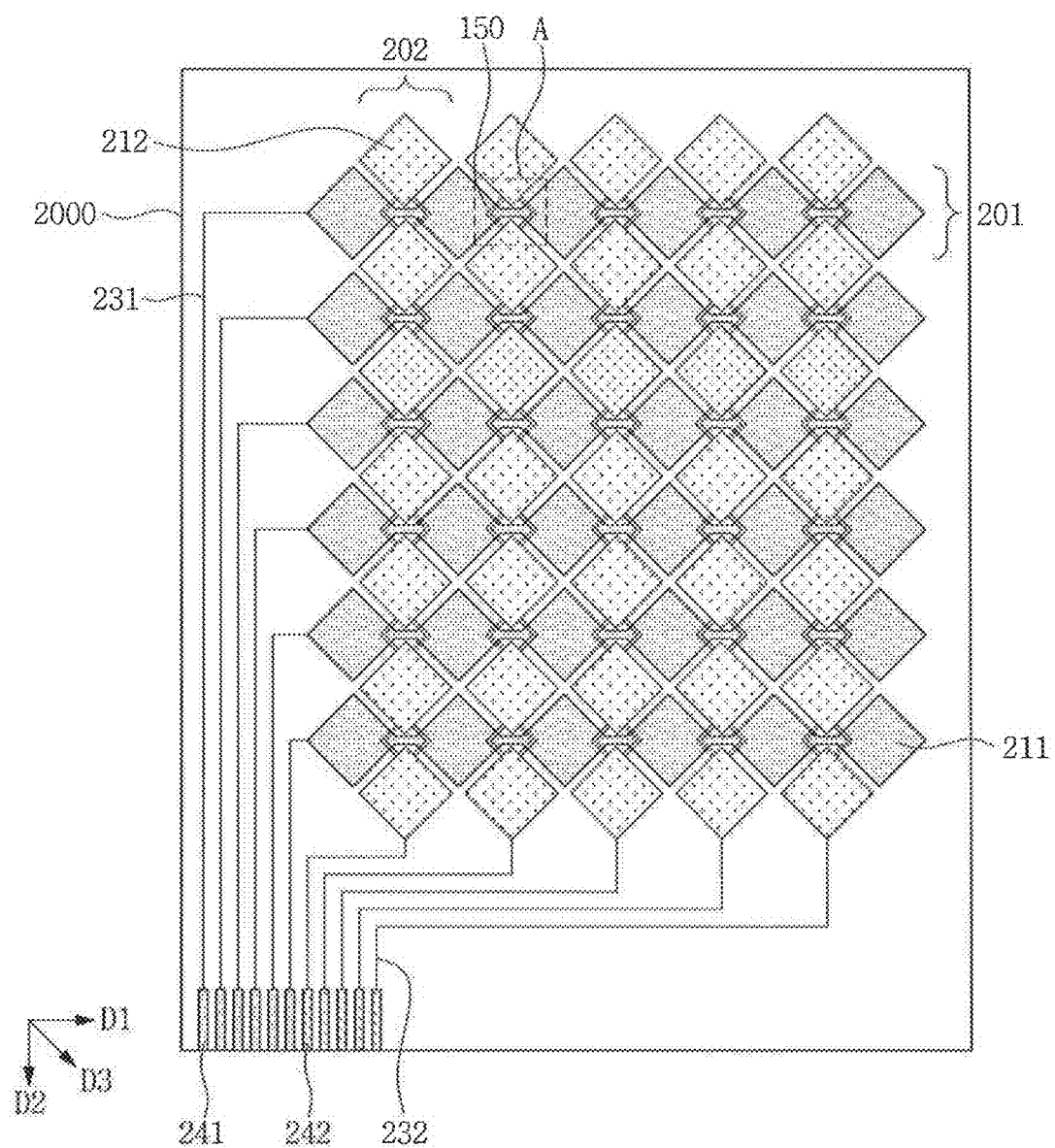
FIG. 2 is a plan view illustrating the display device of FIG. 1 according to an exemplary embodiment of the present invention.

FIG. 1 is an exploded perspective view illustrating a display device according to an exemplary embodiment of the present invention, and FIG. 2 is a plan view illustrating the display device of FIG. 1 according to an exemplary embodiment of the present invention.

The display device according to an exemplary embodiment of the present invention includes a display panel 1000, a touch sensing unit 2000, and a cover glass 3000, as illustrated in FIGS. 1 and 2.

The display panel 1000 may be a liquid crystal display (LCD) panel, an organic light emitting diode (OLED) display panel, a plasma display panel (PDP), or an electrophoretic display (EPD) panel.

The display panel 1000 may include a plurality of pixels PX arranged in a matrix form. An individual pixel PX is depicted as having a substantially rhombic shape. However, exemplary embodiments of the present invention are not limited thereto, and the pixel PX may have various shapes such as a quadrangular shape and a triangular shape.

In an exemplary embodiment of the present invention, the pixels PX may include a red pixel, a green pixel, and a blue pixel. As another example, the pixels PX may include a red pixel, a green pixel, a blue pixel, a cyan pixel, a magenta pixel, a yellow pixel, and a white pixel.

The touch sensing unit 2000 may be located on the display panel 1000. For example, in the case where the display panel 1000 is the OLED display device, the display panel 1000 may include a substrate 131 (see FIG. 5) and an encapsulation layer 133 (see FIG. 5) on the substrate 131, and in such an embodiment, the touch sensing unit 2000 may be located on the encapsulation layer 133 of the display panel 1000. For example, the touch sensing unit 2000 may be located between the encapsulation layer 133 of the display panel 1000 and the cover glass 3000.

The encapsulation layer 133 may be a transparent insulating substrate including glass or a transparent plastic material. In addition, the encapsulation layer 133 may have a structure in which one or more inorganic layers and one or more organic layers are alternately stacked.

As another embodiment, the touch sensing unit 2000 may be disposed in the display panel 1000, for example, between the substrate 131 and the encapsulation layer 133.

As such, the touch sensing unit 2000 may be located above the display panel 1000 or in the display panel 1000. In other words, the touch sensing unit 2000 may be located on the substrate 131 of the display panel 1000.

The touch sensing unit 2000 includes a plurality of first sensing units 201 and a plurality of second sensing units 202, as illustrated in FIG. 2.

The plurality of first sensing units 201 are arranged along a second direction D2. In such an embodiment, each of the first sensing units 201 has a line shape extending along a first direction D1.

Each of the first sensing units 201 includes a plurality of first sensing electrodes 211. For example, one first sensing unit 201 includes a plurality of first sensing electrodes 211 arranged along the first direction D1. The first sensing electrodes 211 included in the one first sensing unit 201 are connected to each other. For example, the first sensing electrodes 211 of the one first sensing unit 201 may be integrally formed in a single unitary structure.

The first sensing electrodes 211 included in the one first sensing unit 201 are connected to a first pad electrode 241 through a first transmission line 231. For example, an outermost one of the first sensing electrodes 211 may be connected to the first pad electrode 241 through the first transmission line 231. The outermost one of the first sensing electrodes 211, the first transmission line 231, and the first pad electrode 241 may be integrally formed in a single unitary structure.

The first sensing electrode 211 included in the one first sensing unit 201 and a first sensing electrode 211 included in another first sensing unit 201 are connected to different first transmission lines from each other. The first transmission lines 231 are connected to different ones of the first pad electrodes 241.

The first sensing electrode 211 may have a rhombic shape. Alternatively, the first sensing electrode 211 may have a quadrangular or triangular shape. The first sensing electrode 211 may have a shape substantially the same as a shape of the pixel PX, for example.

The first sensing electrode 211 may include low-resistance metals such as titanium (Ti), aluminum (Al), silver (Ag), copper (Cu), chromium (Cr), or nickel (Ni). For example, the first sensing electrode 211 may include three vertically stacked layers (e.g., first, second and third layers). In such an embodiment, each of the first layer and the third layer may include titanium (Ti), and the second layer between the first layer and the third layer may include aluminum (Al). The first layer and the third layer may have a substantially same thickness in a vertical direction, and a thickness of the second layer may be greater than the thicknesses of the first layer (or the third layer).

In addition, the first sensing electrode 211 may include metal or transparent conductive oxide (TCO). Such transparent conductive oxide (TCO) may include indium tin oxide (ITO), indium zinc oxide (IZO), zinc oxide (ZnO), carbon nanotube (CNT), or graphene.

The plurality of second sensing units 202 are arranged along the first direction D1. In such an embodiment, each of the second sensing units 202 has a line shape extending along the second direction D2. The second direction D2 intersects the first direction D1.

Each of the second sensing units 202 includes a plurality of second sensing electrodes 212. For example, one second sensing unit 202 includes a plurality of second sensing electrodes 212 arranged along the second direction D2. The second sensing electrodes 212 included in the one second sensing unit 202 are connected to each other through a connection electrode 150. The connection electrode 150 connects two second sensing electrodes 212 that are adjacent to each other in the second direction D2.

The connection electrode 150 is located on a layer different from a layer on which the first sensing electrodes 211 and the second sensing electrodes 212 are located. For example, while the first sensing electrodes 211 and the second sensing electrodes 212 include a substantially same material and are located on a substantially same layer, the connection electrode 150 may be located below the first sensing electrodes 211 and the second sensing electrodes 212.

The second sensing electrodes 212 included in the one second sensing unit 202 are connected to a second pad electrode 242 through a second transmission line 232. For example, an outermost one of the second sensing electrodes 212 may be connected to the second pad electrode 242 through the second transmission line 232. The outermost one of the second sensing electrodes 212, the second transmission line 232, and the second pad electrode 242 may be integrally formed in a single unitary structure.

The second sensing electrode 212 included in the one second sensing unit 202 and a second sensing electrode 212 included in another second sensing unit 202 are connected to different second transmission lines 232 from each other. The second transmission lines 232 are connected to different ones of the second pad electrodes 242.

The second sensing electrode 212 may have a rhombic shape. Alternatively, the second sensing electrode 212 may have a quadrangular or triangular shape. The second sensing electrode 212 may have a shape substantially the same as a shape of the pixel PX, for example.

The second sensing electrode 212 may include a material substantially the same a material included in the first sensing electrode 211. For example, the second sensing electrode 212 may also include titanium (Ti), aluminum (Al), silver (Ag), copper (Cu), chromium (Cr), or nickel (Ni).

In addition, the second sensing electrode 212 may have a structure substantially the same as a structure of the first sensing electrode 211. For example, the second sensing electrode 212 may include three vertically stacked layers (e.g., first, second and third layers). In such an embodiment, each of the first layer and the third layer may include titanium (Ti), and the second layer between the first layer and the third layer may include aluminum (Al).

The first sensing electrode 211 and the second sensing electrode 212 are disposed alternately in a third direction D3. The third direction D3 intersects the first direction D1 and the second direction D2.

The first sensing electrodes 211 and the second sensing electrodes 212 may include a substantially same material and may be located on a substantially same layer. However, for convenience of illustration, the inside of the first sensing electrodes 211 and the inside of the second sensing electrodes 212 are filled with different patterns in FIG. 2.

The first sensing electrodes 211 and the second sensing electrodes 212 form a touch sensor for sensing a touch. As used herein, the term touch may include not only the case where an object contacts the touch panel (e.g., contact touch), but also the case where an object is hovering in a state close to or approaching the touch panel (e.g., non-contact touch).

In an exemplary embodiment of the present invention, the first sensing electrode 211 is connected to a driver of the display panel 1000 through the first pad 241, and the second sensing electrode 212 is connected to the driver through the second pad 242. The driver applies a driving signal to the second sensing electrode 212, and receives an output signal from the first sensing electrode 211. In addition, the driver may apply a driving signal to the first sensing electrode 211, and receive an output signal from the second sensing electrode 212.

The cover glass 3000 may be located on the touch sensing unit 2000. The cover glass 3000 may include glass, sapphire, diamond, polymethylmethacrylate (PMMA), or polycarbonate (PC).

Figure 3:
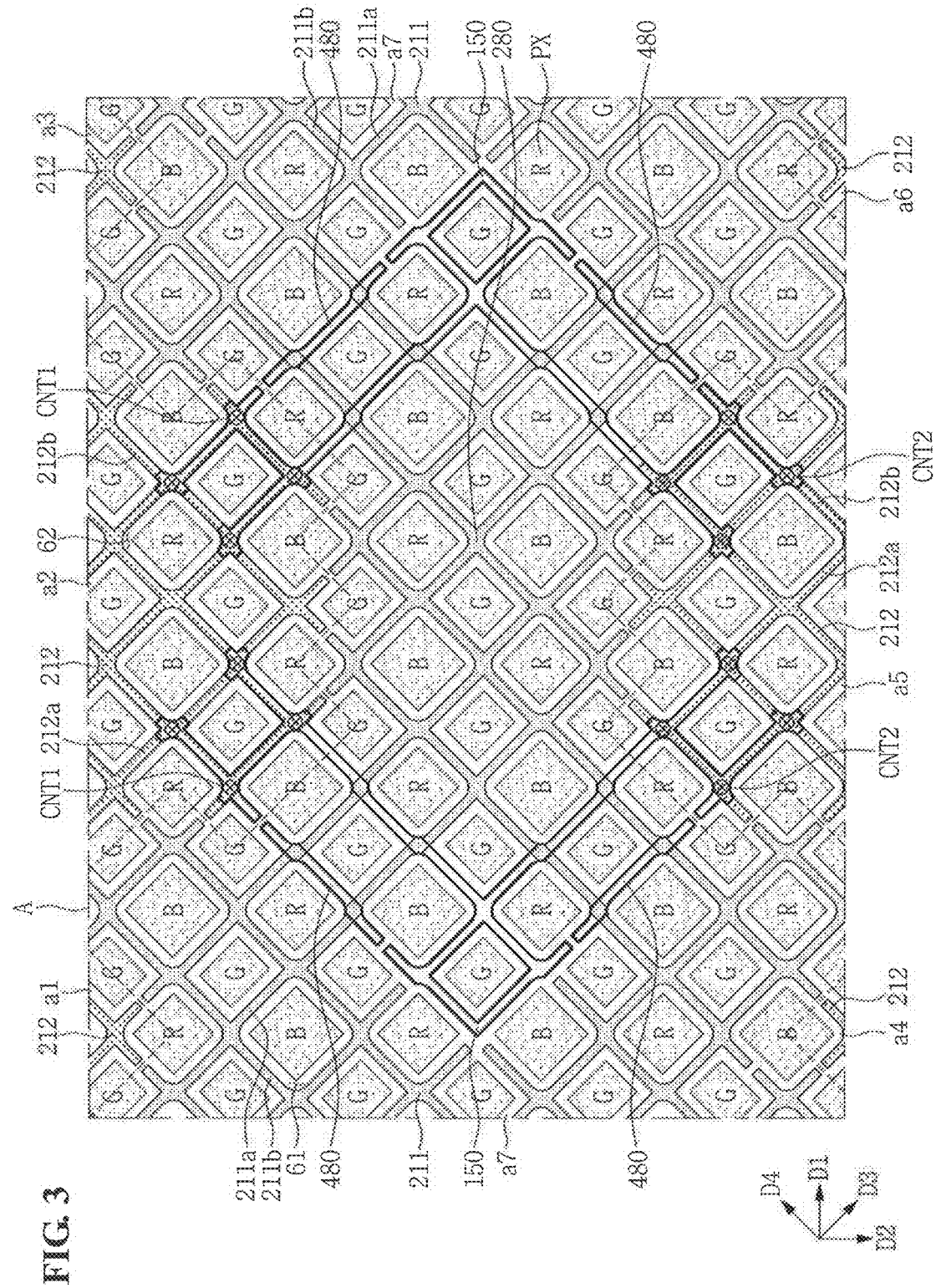
FIG. 3 is a view enlarging part A of FIG. 2 according to an exemplary embodiment of the present invention.

FIG. 3 is a view enlarging part A of FIG. 2 according to an exemplary embodiment of the present invention.

First, three areas demarcated by a dashed line on the upper side of FIG. 3 and an edge on the upper side of FIG. 3 are a first area a1, a second area a2, and a third area a3, respectively, sequentially from the left side. In addition, three areas demarcated by a dashed line on the lower side of FIG. 3 and an edge on the lower side of FIG. 3 are a fourth area a4, a fifth area a5, and a sixth area a6, respectively, sequentially from the left side. The remaining area excluding the first to sixth areas a1 to a6 is a seventh area a7.

An upper one of two adjacent second sensing electrodes 212 is located in the first area a1, the second area a2 and the third area a3, and a lower one of the two adjacent second sensing electrodes 212 is located in the fourth area a4, the fifth area a5, and the sixth area a6.

Two adjacent first sensing electrodes 211 are located in the seventh area a7. Edges of the two adjacent first sensing electrodes 211 are directly connected to each other. When the connected portion is a connection portion 280, the connection portion 280 is located between two connection electrodes 150 that are adjacent to each other in the first direction D1. In addition, the connection portion 280 is located between two second sensing electrodes 212 that are adjacent to each other in the second direction D2. Accordingly, the connection portion 280 is located in an area surrounded by two adjacent connection electrodes 150 and two adjacent second sensing electrodes 212.

Two adjacent first sensing electrodes 211 and the connection portion 280 located between the two adjacent first sensing electrodes 211 are integrally formed in a single unitary structure.

The connection electrode 150 is located in the second area a2, the seventh area a7, and the fifth area a5.

A dummy electrode 480 is located in the seventh area a7. For example, the dummy electrode 480 may be located between two second sensing electrodes 212 that are adjacent to each other in the second direction D2 in the seventh area a7. In such an embodiment, the dummy electrode 480 is located adjacent to the connection electrode 150.

The first sensing electrodes 211 and the second sensing electrodes 212 of FIG. 3 may include a substantially same material and may be disposed on a substantially same layer. However, for convenience of illustration, the inside of the first sensing electrodes 211 and the inside of the second sensing electrodes 212 are filled with different patterns in FIG. 3.

As illustrated in FIG. 3, the first sensing electrode 211 may be in the form of a mesh. In other words, the first sensing electrode 211 may have a plurality of holes 61 therethrough. The first sensing electrode 211 may include a plurality of first sensing lines 211a and a plurality of second sensing lines 211b intersecting the first sensing lines 211a. The first sensing lines 211a and the second sensing lines 211b may be disposed around the holes 61.

The first sensing lines 211a are parallel to each other, and the second sensing lines 211b are parallel to each other. Each of the first sensing lines 211a may have a line shape extending in the third direction D3, and each of the second sensing lines 211b may have a line shape extending in a fourth direction D4. An area surrounded by the first sensing lines 211a and the second sensing lines 211b may correspond to the hole 61 of the first sensing electrode 211.

The second sensing electrode 212 may be in the form of a mesh. In other words, the second sensing electrode 212 may have a plurality of holes 62 therethrough. The second sensing electrode 212 may include a plurality of third sensing lines 212a and a plurality of fourth sensing lines 212b that intersect the third sensing lines 212a. The third sensing lines 212a and the fourth sensing lines 212b may be disposed around the holes 62. The third sensing lines 212a are parallel to each other, and the fourth sensing lines 212b are parallel to each other.

Each of the third sensing lines 212a may have a line shape extending in the third direction D3, and each of the fourth sensing lines 212b may have a line shape extending in the fourth direction D4. An area surrounded by the third sensing lines 212a and the fourth sensing lines 212b may correspond to the hole 62 of the second sensing electrode 212.

The pixels PX may be located in the hole 61 of the first sensing electrode 211 and the hole 62 of the second sensing electrode 212. The size of the hole 61 or 62 is proportional to the size of the pixel therein. For example, between the red pixel R, the green pixel G and the blue pixel B, the blue pixel B has the largest size, and the green pixel G has the smallest size. In such an embodiment, the hole (hereinafter, "a first hole") in which the blue pixel B is located has a size larger than a size of the hole (hereinafter, "a second hole") in which the green pixel G is located. In an exemplary embodiment of the present invention, the red pixel R has a size larger than the size of the green pixel G and is smaller than the blue pixel B, and thus, the hole in which the red pixel R is located is larger than the size of the second hole and less than the size of the first hole.

When the display panel 1000 is an OLED display panel, for example, the size of the pixel PX may be the size of a light emitting layer or the size of a light emission area. The light emission area may be an area defined by an opening of a light blocking layer (or a pixel defining layer) included in the display panel 1000. The first sensing electrodes 211 and the second sensing electrodes 212 may be located such that they correspond to the light blocking layer of the display panel 1000. In other words, the first, second, third and fourth sensing lines 211a, 211b, 212a, and 212b may be disposed to correspond to the light blocking layer.

The connection electrodes 150 and the dummy electrodes 480 are also disposed to correspond to the light blocking layer.

The first sensing electrode 211, the second sensing electrode 212, the connection electrode 150, and the dummy electrode 480 will be described in more detail with reference to FIGS. 4 and 5.

Figure 4:
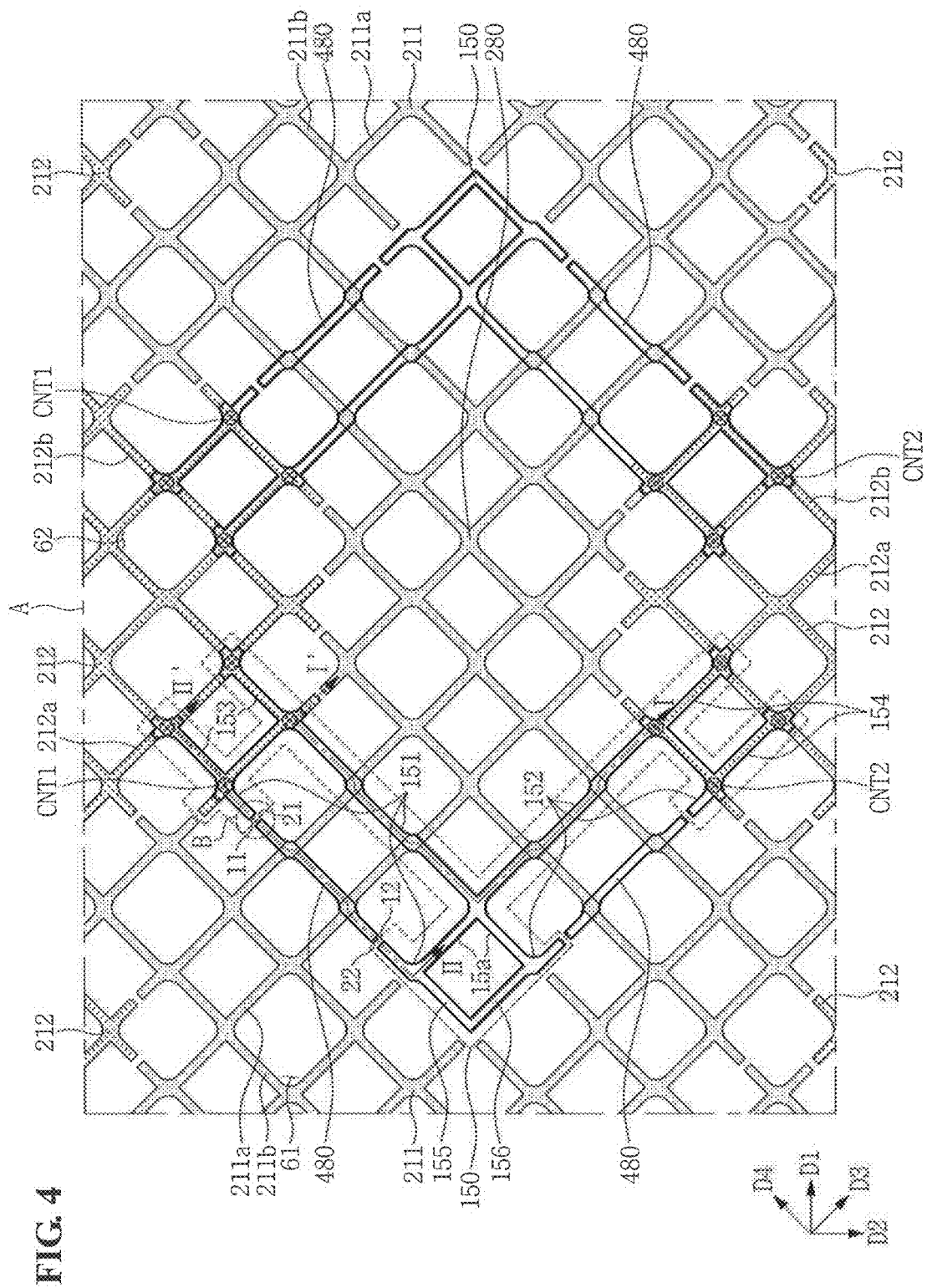
FIG. 4 is a view illustrating a first sensing electrode, a second sensing electrode, a connection electrode, and a dummy electrode of FIG. 3 according to an exemplary embodiment of the present invention.
Figure 5:
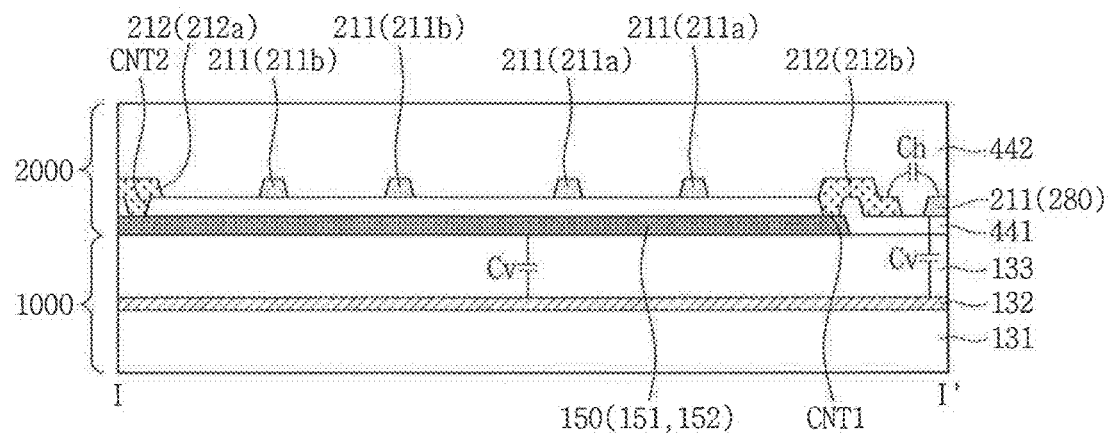
FIG. 5 is a cross-sectional view taken along line I-I' of FIG. 4 according to an exemplary embodiment of the present invention.
Figure 6:
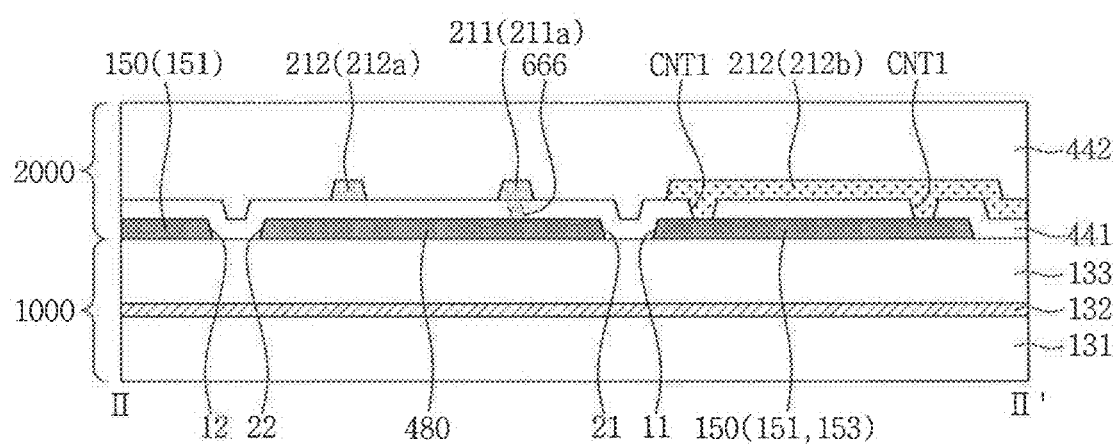
FIG. 6 is a cross-sectional view taken along line II-II' of FIG. 4 according to an exemplary embodiment of the present invention.

FIG. 4 is a view illustrating a first sensing electrode, a second sensing electrode, a connection electrode, and a dummy electrode in FIG. 3 according to an exemplary embodiment of the present invention, FIG. 5 is a cross-sectional view taken along line I-I' of FIG. 4 according to an exemplary embodiment of the present invention, and FIG. 6 is a cross-sectional view taken along line II-II' of FIG. 4 according to an exemplary embodiment of the present invention.

The connection electrode 150 may include a first connection line 151 and a second connection line 152, as illustrated in FIG. 4. In addition, the connection electrode 150 may further include a third connection line 153 extending from one side of the first connection line 151 and a fourth connection line 154 extending from one side of the second connection line 152. In addition, the connection electrode 150 may further include a fifth connection line 155 extending from another side of the first connection line 151 and a sixth connection line 156 extending from another side of the second connection line 152. The first to sixth connection lines 151 to 156 are integrally formed in a single unitary structure.

Each of the first connection line 151 and the second connection line 152 may have a C-like shape, for example. In such an embodiment, the first connection line 151 and the second connection line 152 have a symmetric shape with respect to an imaginary line which passes through the connection portion 280 and is parallel to the first direction D1. The first connection line 151 is connected to the second sensing electrode 212 on the upper side through a first contact hole CNT1, and the second connection line 152 is connected to the sensing electrode 212 on the lower side through a second contact hole CNT2.

The third connection line 153 extends from the first connection line 151 in the fourth direction D4. The third connection line 153 is connected to the second sensing electrode 212 on the upper side through the first contact hole CNT1. In an exemplary embodiment of the present invention, the third connection line 153 and the first connection line 151 are connected to the second sensing electrode 212 on the upper side through different first contact holes CNT1.

The fourth connection line 154 extends from the second connection line 152 in the third direction D3. The fourth connection line 154 is connected to the second sensing electrode 212 on the lower side through the second contact hole CNT2. The third connection line 153 and the fourth connection line 154 have a symmetric shape with respect to the aforementioned imaginary line. In an exemplary embodiment of the present invention, the fourth connection line 154 and the second connection line 152 are connected to the second sensing electrode 212 on the lower side through different second contact holes CNT2.

The fifth connection line 155 extends from the first connection line 151 in a direction opposite to the fourth direction D4.

The sixth connection line 156 extends from the second connection line 152 in a direction opposite to the third direction D3. In such an embodiment, the fifth connection line 155 and the sixth connection line 156 have a symmetric shape with respect to the aforementioned imaginary line. In addition, the fifth connection line 155 and the sixth connection line 156 are connected to each other. For example, the fifth connection line 155 and the sixth connection line 156 form a leftmost edge of the connection electrode 150 in FIG. 4.

The dummy electrode 480 may be located between opposing end portions 11 and 12 of the connection electrode 150, as illustrated in FIGS. 4 and 6. For example, the dummy electrode 480 may be located between opposing end portions 11 and 12 of the first connection line 151. One end portion 11 of the first connection line 151 opposes one end portion 21 of the dummy electrode 480, and another end portion 12 of the first connection line 151 opposes another end portion 22 of the dummy electrode 480.

In addition, the dummy electrodes 480 may be located between opposing end portions of the second connection line 152.

The dummy electrode 480 may have a line shape extending in the fourth direction D4, as illustrated in FIG. 4. The dummy electrode 480 may overlap the first sensing electrode 211, as illustrated in FIGS. 4 and 6. For example, the dummy electrode 480 overlaps the first sensing line 211a of the first sensing electrode 211. In other words, the dummy electrode 480 intersects the first sensing line 211a.

End portions of the dummy electrode 480 and the connection electrode 150 that oppose each other may be located, for example, between the first sensing electrode 211 and the second sensing electrode 212 that are adjacent to each other. For example, opposing end portions 21 and 11 of the dummy electrode 480 and the connection electrode 150 may be located between the first sensing line 211a of the first sensing electrode 211 and the third sensing line 212a of the second sensing electrode 212. In other words, opposing end portions 21 and 11 of the dummy electrode 480 and the connection electrode 150 may be located between the first sensing line 211a and the third sensing line 212a that are adjacent to each other.

In an exemplary embodiment of the present invention, other end portions 22 and 12 of the dummy electrode 480 and the connection electrode 150 may be located, for example, in the hole 61 of the first sensing electrode 211.

As illustrated in FIGS. 5 and 6, the connection electrode 150 and the dummy electrode 480 are located on a substantially same layer. The connection electrode 150 and the dummy electrode 480 may be located on the substrate 131 of the display panel 1000. For example, the connection electrode 150 and the dummy electrode 480 may be located on the encapsulation layer 133 on the substrate 131. For example, the connection electrode 150 and the dummy electrode 480 may be located between the encapsulation layer 133 and a first insulating layer 441.

The connection electrode 150 may overlap one first sensing electrode 211 and two adjacent second sensing electrodes 212. For example, one side of the connection electrode 150 overlaps the second sensing electrode 212 on the upper side (e.g., of FIG. 4), another side of the connection electrode 150 overlaps the second sensing electrode 212 on the lower side (e.g., of FIG. 4), and a central portion of the connection electrode 150 overlaps the first sensing electrode 211.

The connection electrode 150 connects two adjacent second sensing electrodes 212 to each other. For example, one side of the connection electrode 150 is connected to the second sensing electrode 212 on the upper side through the first contact hole CNT1 of the first insulating layer 441, and another side of the connection electrode 150 is connected to the second sensing electrode 212 on the lower side through the second contact hole CNT2 of the first insulating layer 441. For example, one side of the connection electrode 150 may be connected to the second sensing electrode 212 on the upper side through four first contact holes CNT1, and another side of the connection electrode 150 may be connected to the second sensing electrode 212 on the lower side through four second contact holes CNT2.

The dummy electrode 480 is not physically connected to the connection electrode 150 and the first sensing electrodes 211. In addition, the dummy electrode 480 is not physically connected to the second sensing electrodes 212.

For example, the dummy electrode 480 may be in a floating state or may be a floating electrode having such a state. For example, the dummy electrode 480 has an isolated shape in that it is not connected to any signal lines including the connection electrodes 150, the first sensing electrodes 211 and the second sensing electrodes 212. In other words, the dummy electrode 480 is not physically connected to any signal line of the display device in a direct manner. As an example, the signal line may include a line directly receiving a signal from any signal source, or a line indirectly receiving a signal from the signal source through at least one other line, or a line indirectly receiving a signal from the signal source through at least one capacitor, or a line indirectly receiving a signal from the signal source through at least one switch.

The number of intersections between the connection electrode 150 and the first sensing electrode 211 may be reduced by using the dummy electrode 480 in the floating state. Accordingly, the possibility of a short circuit between the connection electrode 150 and the first sensing electrode 211 may be reduced. Accordingly, short-circuit failure in which the first sensing electrode 211 and the second sensing electrode 212 are connected to each other by the connection electrode 150 may be minimized.

In addition, since the dummy electrode 480 is located close to the connection electrode 150, in an area between the end portions 11 and 12 of the connection electrode 150, the dummy electrode 480 is visibly recognized as a part of the connection electrode 150. Accordingly, short-circuit failure between the connection electrode 150 and the first sensing electrode 211 may be minimized without a visibility concern.

Although the end portions 11 and 12 of the connection electrodes 150 are not connected to each other by the dummy electrode 480, the area of the connection electrode 150 contacting the first contact hole CNT1 and the second contact hole CNT2 barely changes, and thus, a contact resistance between the connection electrode 150 and the second sensing electrodes 212 barely increases.

In reference to FIGS. 5 and 6, the first insulating layer 441 is located on the connection electrode 150, the dummy electrode 480, and the encapsulation layer 133. The first insulating layer 441 has first and second contact holes CNT1 and CNT2 provided therethrough.

In an exemplary embodiment of the present invention, the first insulating layer 441 may be located only on the connection electrode 150 and the dummy electrode 480. In another exemplary embodiment of the present invention, the first insulating layer 441 may be located such that it corresponds to the light blocking layer described above. In another exemplary embodiment of the present invention, the first insulating layer 441 may be located on the connection electrode 150 and the dummy electrode 480 to overlap the entire surface of the substrate 131.

As illustrated in FIGS. 5 and 6, the first sensing electrode 211 and the second sensing electrode 212 are located on a substantially same layer. The first sensing electrode 211 and the second sensing electrode 212 may be located on the first insulating layer 441. For example, the first sensing electrode 211 and the second sensing electrode 212 may be located between the first insulating layer 441 and a second insulating layer 442.

As illustrated in FIG. 5, a capacitor Ch (e.g., a horizontal capacitor) is formed between opposing end portions of the first sensing electrode 211 and the second sensing electrode 212. In addition, a first capacitor Cv (e.g., a vertical capacitor) is formed between the first sensing electrode 211 and a common electrode 132 of the display panel 1000, and a second capacitor (e.g., a vertical capacitor) is formed between the second sensing electrode 212 and the common electrode 132. It is possible to determine whether or not a touch is made based on the capacitance change of the horizontal capacitor Ch and the vertical capacitors Cv.

The common electrode 132 corresponds to, for example, a cathode electrode of a light emitting diode ("LED") including a light emitting layer. The common electrode 132 may be located between the substrate 131 and the encapsulation layer 133. For example, the common electrode 132 may be located between the light emitting layer and the encapsulation layer 133.

As shown in FIGS. 5 and 6, the second insulating layer 442 is located on the first sensing electrode 211, the second sensing electrode 212, and the first insulating layer 441.

In an exemplary embodiment of the present invention, the second insulating layer 442 may be located only on the first sensing electrode 211 and the second sensing electrode 212. In another exemplary embodiment of the present invention, the second insulating layer 442 may be located such that it corresponds to the light blocking layer described above. In another exemplary embodiment of the present invention, the second insulating layer 442 may be located on the first sensing electrode 211, the second sensing electrode 212, and the first insulating layer 441 to overlap the entire surface of the substrate 131.

In an exemplary embodiment of the present invention, when of the two dummy electrodes 480 on the left side of FIG. 4, the upper dummy electrode (e.g., the dummy electrode between 11 and 12) is a first dummy electrode, and the lower dummy electrode (e.g., the dummy electrode having a shape symmetric to the shape of the first dummy electrode with respect to the aforementioned imaginary line) is a second dummy electrode, and when of the contact holes CNT1 and CNT2, one contact hole (e.g., the contact hole denoted as CNT1 in FIG. 4) that is adjacent to the first dummy electrode is as a third contact hole, and one contact hole (e.g., the contact hole denoted as CNT2 in FIG. 4) that is adjacent to the second dummy electrode is a fourth contact hole, the first dummy electrode and the second dummy electrode are located on a connection path between the third contact hole and the fourth contact hole. In other words, the dummy electrode may be disposed in a non-continuous line shape (e.g., a dotted line shape) on the path between the third contact hole and the fourth contact hole. For example, on the path between the third contact hole and the fourth contact hole, the first dummy electrode is extended along the fourth direction D4 and the second dummy electrode is extended along the third direction D3. In addition, the first and second dummy electrodes are disposed along outer edges of the connection electrode 150 on the left side of FIG. 4.

If a portion 15a of the connection electrode 150 is removed, the disconnected part of the connection electrode 150 would form another dummy electrode; therefore, three dummy electrodes would be disposed on the path between the third contact hole and the fourth contact hole. In other words, three dummy electrodes may be arranged in a non-continuous line shape (e.g., a dotted line shape) on the path between the third contact hole and the fourth contact hole. The dummy electrode including the three dummy electrodes may have an L-like shape or a "<"-like shape. In such an embodiment, a portion of the connection electrode 150 on a path connecting the first contact hole CNT1 and the second contact hole CNT2 may also have an L-like shape or a "<"-like shape.

Figure 7:
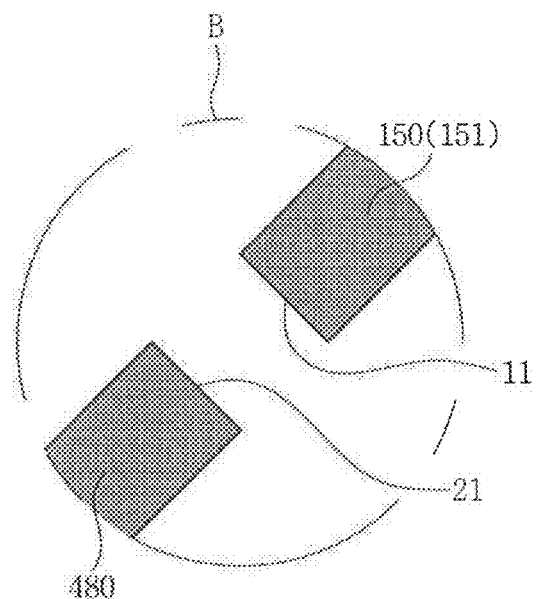
FIG. 7 is a view enlarging part B of FIG. 4 according to an exemplary embodiment of the present invention.

FIG. 7 is a view enlarging part B of FIG. 4 according to an exemplary embodiment of the present invention.

As illustrated in FIG. 7, each of the opposing end portions 21 and 11 of the dummy electrode 480 and the connection electrode 150 may have a straight line shape. The opposing end portions 21 and 11 are parallel to each other. The end portions 21 and 11 are, for example, parallel to the third direction D3.

In an exemplary embodiment of the present invention, each of other opposing end portions 22 and 12 of the dummy electrode 480 and the connection electrode 150 may also have a straight line shape.

A distance between one end portion 21 of the dummy electrode 480 and one end portion 11 of the connection electrode 150 may be substantially equal to or different from a distance between another end portion 22 of the dummy electrode 480 and another end portion 12 of the connection electrode 150.

Figure 8:
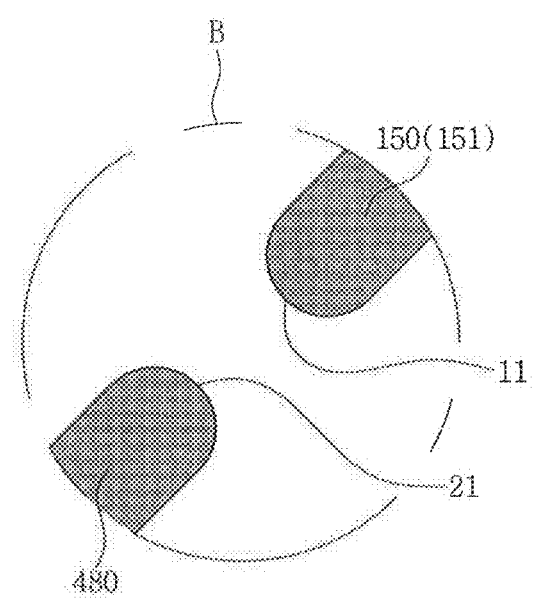
FIG. 8 is a view enlarging part B of FIG. 4 according to another exemplary embodiment of the present invention.

FIG. 8 is a view enlarging part B of FIG. 4 according to another exemplary embodiment of the present invention.

As illustrated in FIG. 8, the opposing end portions 21 and 11 of the dummy electrode 480 and the connection electrode 150 may have a rounded or curved shape. For example, the opposing end portions 21 and 11 of the dummy electrode 480 and the connection electrode 150 may have a semicircular shape protruding toward each other.

In such an embodiment, the end portion 21 of the dummy electrode 480 and the end portion 11 of the connection electrode 150 may not crack.

Other opposing end portions 22 and 12 of the dummy electrode 480 and the connection electrode 150 may have a rounded shape as in FIG. 8.

Figure 9:
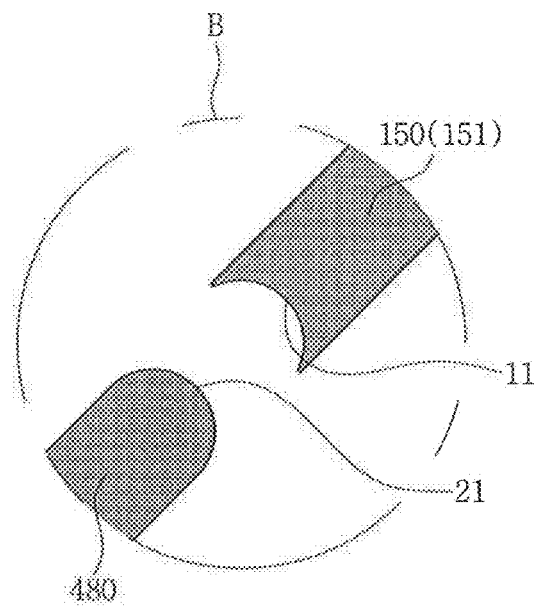
FIG. 9 is a view enlarging part B of FIG. 4 according to another exemplary embodiment of the present invention.

FIG. 9 is a view enlarging part B of FIG. 4 according to another exemplary embodiment of the present invention.

As illustrated in FIG. 9, one of the opposing end portions 21 and 11 of the dummy electrode 480 and the connection electrode 150 may have a rounded shape protruding toward the other of the opposing end portions 21 and 11, and the other of the opposing end portions 21 and 11 may have a concave shape. For example, one end portion 21 of the dummy electrode 480 may have a convex shape, and one end portion 11 of the connection electrode 150 may have a concave shape.

On the other hand, one end portion 21 of the dummy electrode 480 may have a concave shape, and one end portion 11 of the connection electrode 150 may have a convex shape.

A portion 666 (see FIG. 6) of the first insulating layer 441 located at the intersection between the dummy electrode 480 and the first sensing electrode 211 may be damaged, thereby short-circuiting the dummy electrode 480 and the first sensing electrode 211. When this happens, the dummy electrode 480 may function as a signal line and no longer as a floating electrode. In other words, due to the short circuit, the dummy electrode 480 may function as the first sensing electrode 211. In such an embodiment, a horizontal capacitor may be formed between the opposing end portions 21 and 11 of the dummy electrode 480 and the connection electrode 150, and when the end portions of the dummy electrode 480 and the connection electrode 150 have a shape illustrated in FIG. 9, the capacitance of the horizontal capacitor may increase. The increase in the capacitance of the horizontal capacitor contributes to the enhancement of the sensitivity of the touch sensing unit 2000.

Other opposing end portions 22 and 12 of the dummy electrode 480 and the connection electrode 150 may have a round shape as in FIG. 9.

Figure 10:
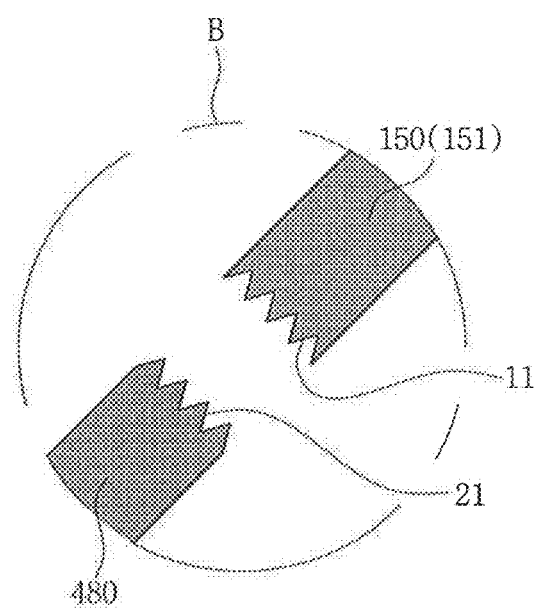
FIG. 10 is a view enlarging part B of FIG. 4 according to another exemplary embodiment of the present invention.

FIG. 10 is a view enlarging part B of FIG. 4 according to another exemplary embodiment of the present invention.

As illustrated in FIG. 10, the opposing end portions 21 and 11 of the dummy electrode 480 and the connection electrode 150 may have a concavo-convex shape. In such an embodiment, a concave portion of the dummy electrode 480 faces a convex portion of the connection electrode 150, and a convex portion of the dummy electrode 480 faces a concave portion of the connection electrode 150.

In the case where the end portions 21 and 11 of the dummy electrode 480 and the connection electrode 150 have a shape as in FIG. 10, when a short circuit occurs between the dummy electrode 480 and the first sensing electrode 211, the capacitance of the horizontal capacitor between the dummy electrode 480 and the connection electrode 150 may increase.

Other opposing end portions 22 and 12 of the dummy electrode 480 and the connection electrode 150 may have a concavo-convex shape as in FIG. 10.

Figure 11:
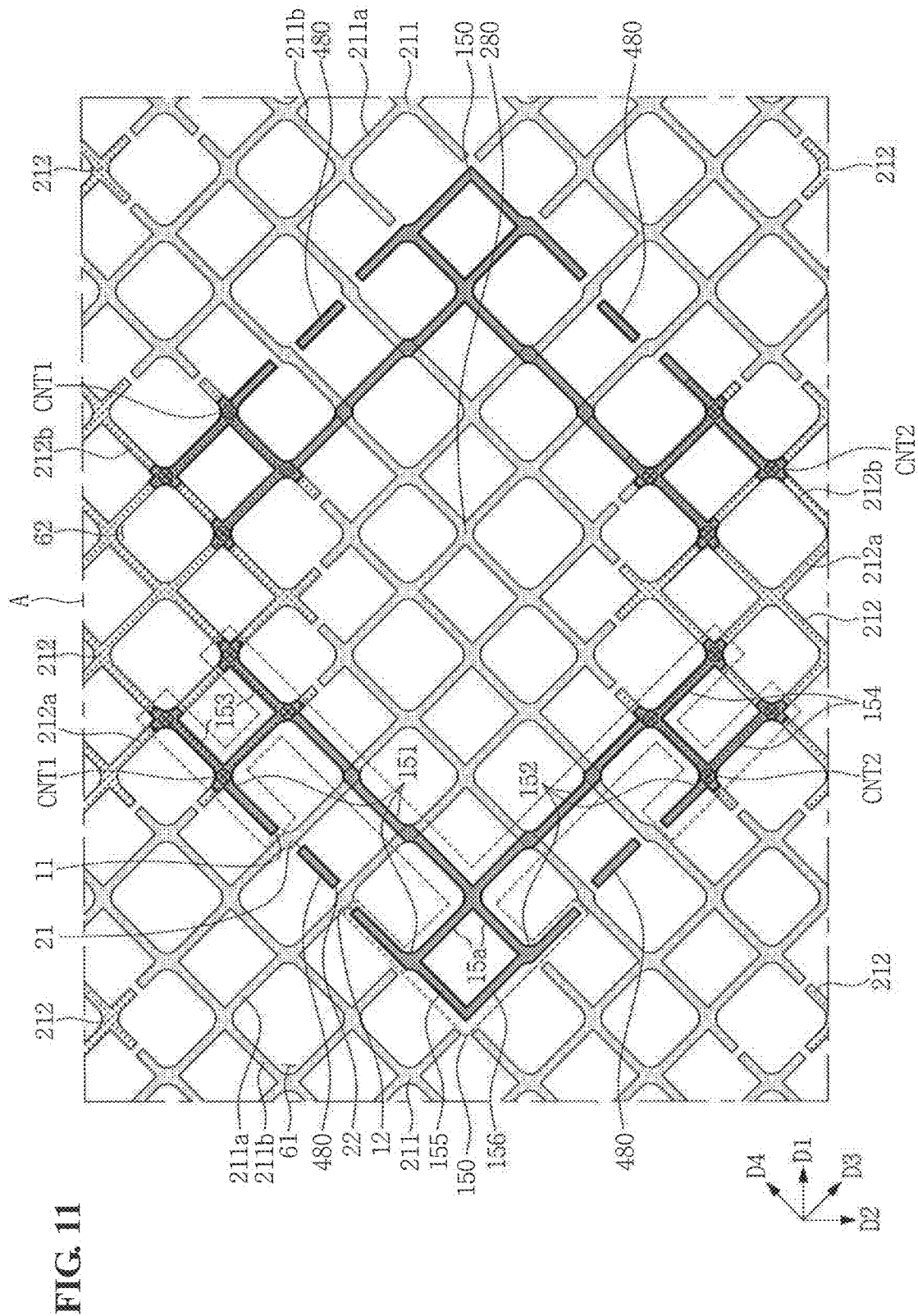
FIG. 11 is a view enlarging part A of FIG. 2 according to another exemplary embodiment of the present invention.

FIG. 11 is a view enlarging part A of FIG. 2 according to another exemplary embodiment of the present invention.

As illustrated in FIG. 11, the dummy electrode 480 may be located between the opposing end portions 11 and 12 of the connection electrode 150. In such an embodiment, the dummy electrode 480 does not intersect the first connection line 151 of the first sensing electrode 211. The dummy electrode 480 is located between the first connection lines 151 that are adjacent to each other.

The first sensing line 211a is located between opposing end portions of the dummy electrode 480 and the connection electrode 150. For example, one first sensing line 211a may be located between one end portion 21 of the dummy electrode 480 and one end portion 11 of the connection electrode 150, and another first sensing line 211a may be located between another end portion 22 of the dummy electrode 480 and another end portion 12 of the connection electrode 150.

The description of the remaining configurations of FIG. 11 is substantially the same as that described with reference to FIGS. 3 to 10.

Figure 12:
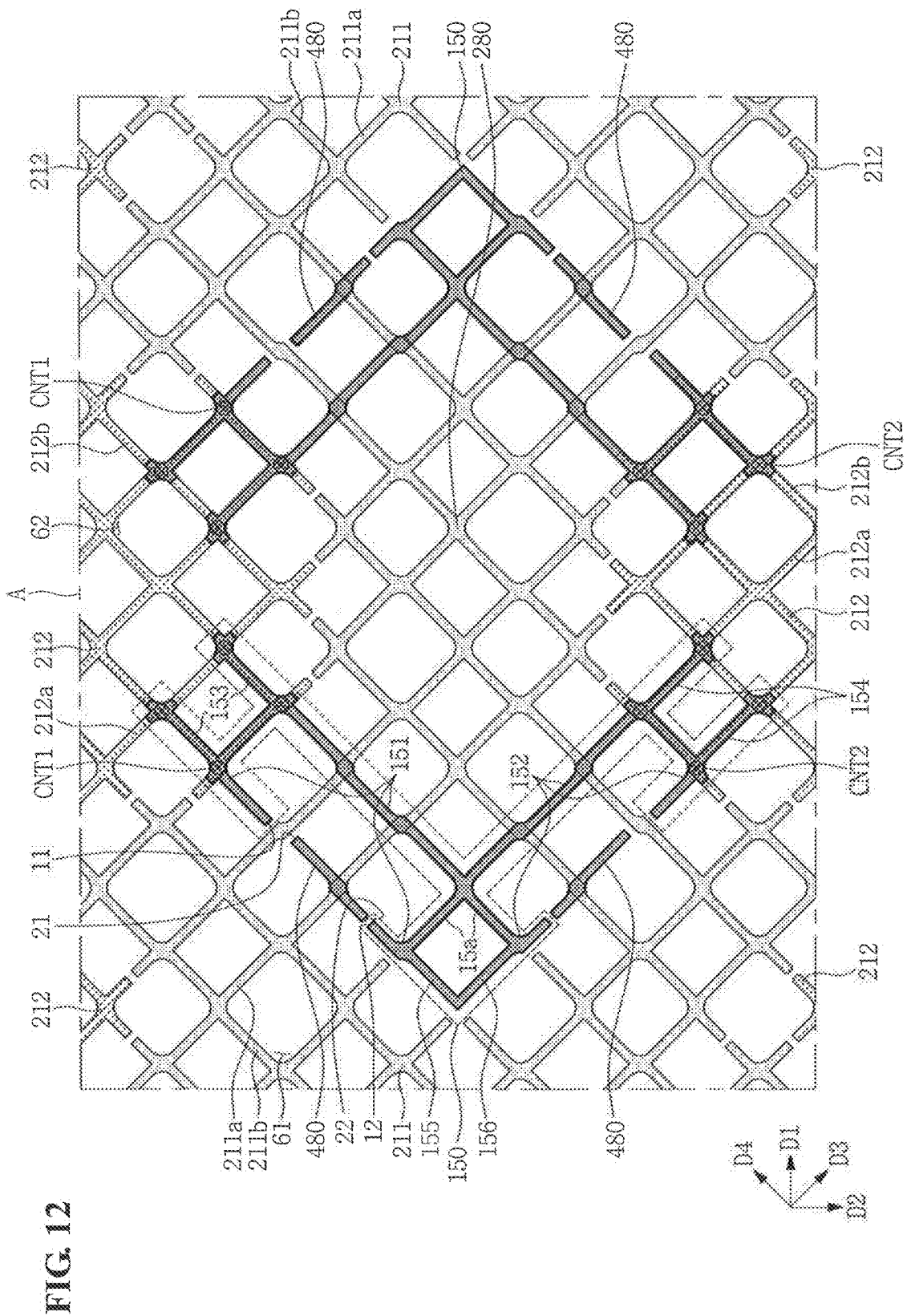
FIG. 12 is a view enlarging part A of FIG. 2 according to another exemplary embodiment of the present invention.

FIG. 12 is a view enlarging part A of FIG. 2 according to another exemplary embodiment of the present invention.

As illustrated in FIG. 12, the dummy electrode 480 may be located between the opposing end portions 11 and 12 of the connection electrode 150. In such an embodiment, the dummy electrode 480 intersects or overlaps one of two adjacent first sensing lines 211a and does not intersect the other of the two adjacent first sensing lines 211a.

For example, of the two adjacent first sensing lines 211a, the first sensing line 211a, which is not intersected by the dummy electrode 480, is located between one end portion 21 of the dummy electrode 480 and one end portion 11 of the connection electrode 150, and the other first sensing line 211a is not located between another end portion 22 of the dummy electrode 480 and another end portion 12 of the connection electrode 150.

A distance between one end portion 21 of the dummy electrode 480 and one end portion 11 of the connection electrode 150 may be greater than a distance between another end portion 22 of the dummy electrode 480 and another end portion 12 of the connection electrode 150.

The description of the remaining configurations of FIG. 12 is substantially the same as that described with reference to FIGS. 3 to 10.

Figure 13:
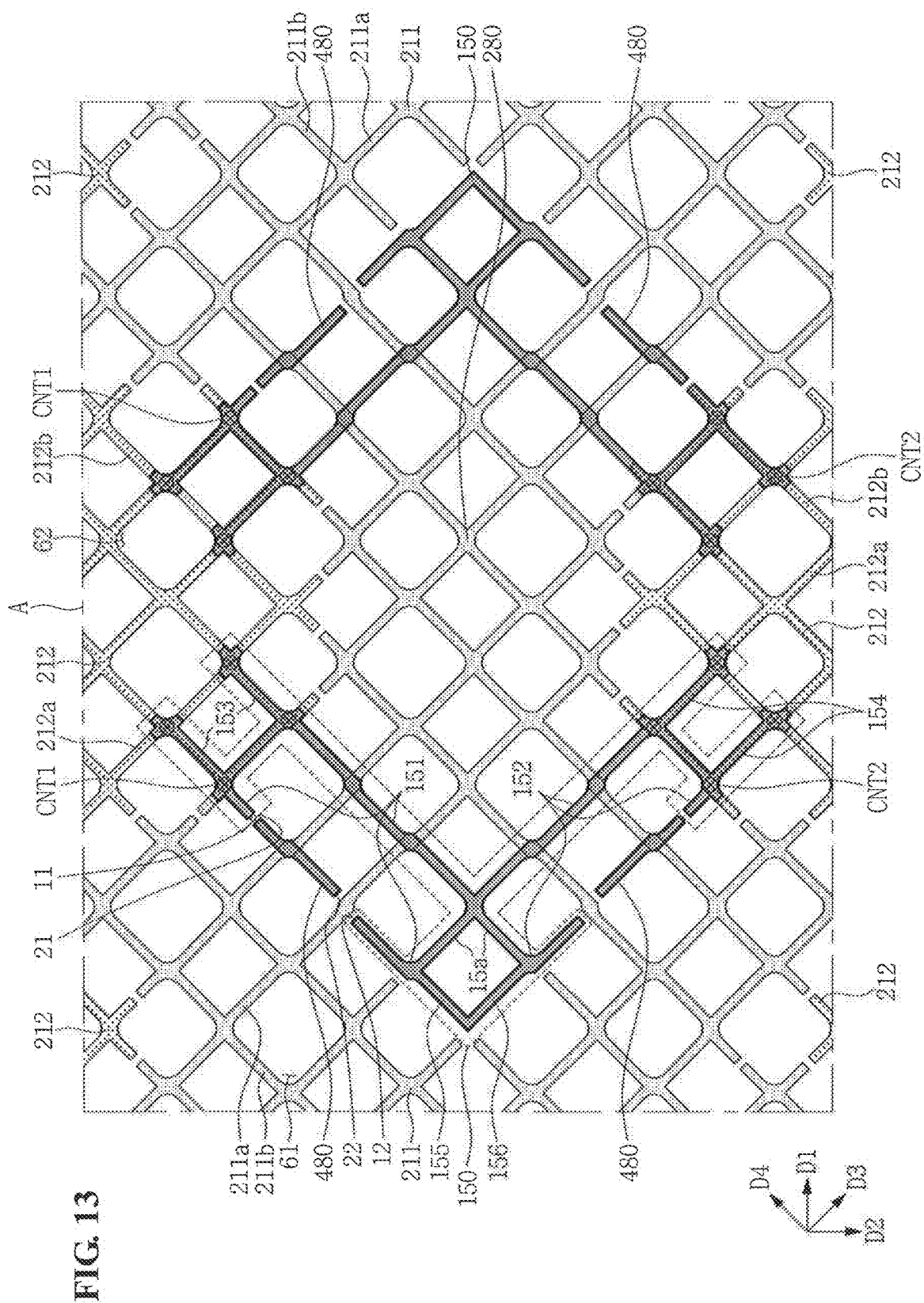
FIG. 13 is a view enlarging part A of FIG. 2 according to another exemplary embodiment of the present invention.

FIG. 13 is a view enlarging part A of FIG. 2 according to another exemplary embodiment of the present invention.

As illustrated in FIG. 13, the dummy electrode 480 may be located between the opposing end portions 11 and 12 of the connection electrode 150. In such an embodiment, the dummy electrode 480 intersects or overlaps one of two adjacent first sensing lines 211a, and does not intersect the other of the two adjacent first sensing lines 211a.

For example, of the two adjacent first sensing lines 211a, the first sensing line 211a, which is not intersected by the dummy electrode 480, is located between another end portion 22 of the dummy electrode 480 and another end portion 12 of the connection electrode 150, and the other first sensing line 211a is not located between one end portion 21 of the dummy electrode 480 and one end portion 11 of the connection electrode 150.

A distance between another end portion 22 of the dummy electrode 480 and another end portion 12 of the connection electrode 150 may be greater than a distance between one end portion 21 of the dummy electrode 480 and one end portion 11 of the connection electrode 150.

The description of the remaining configurations of FIG. 13 is substantially the same as that described with reference to FIGS. 3 to 10.

Figure 14:
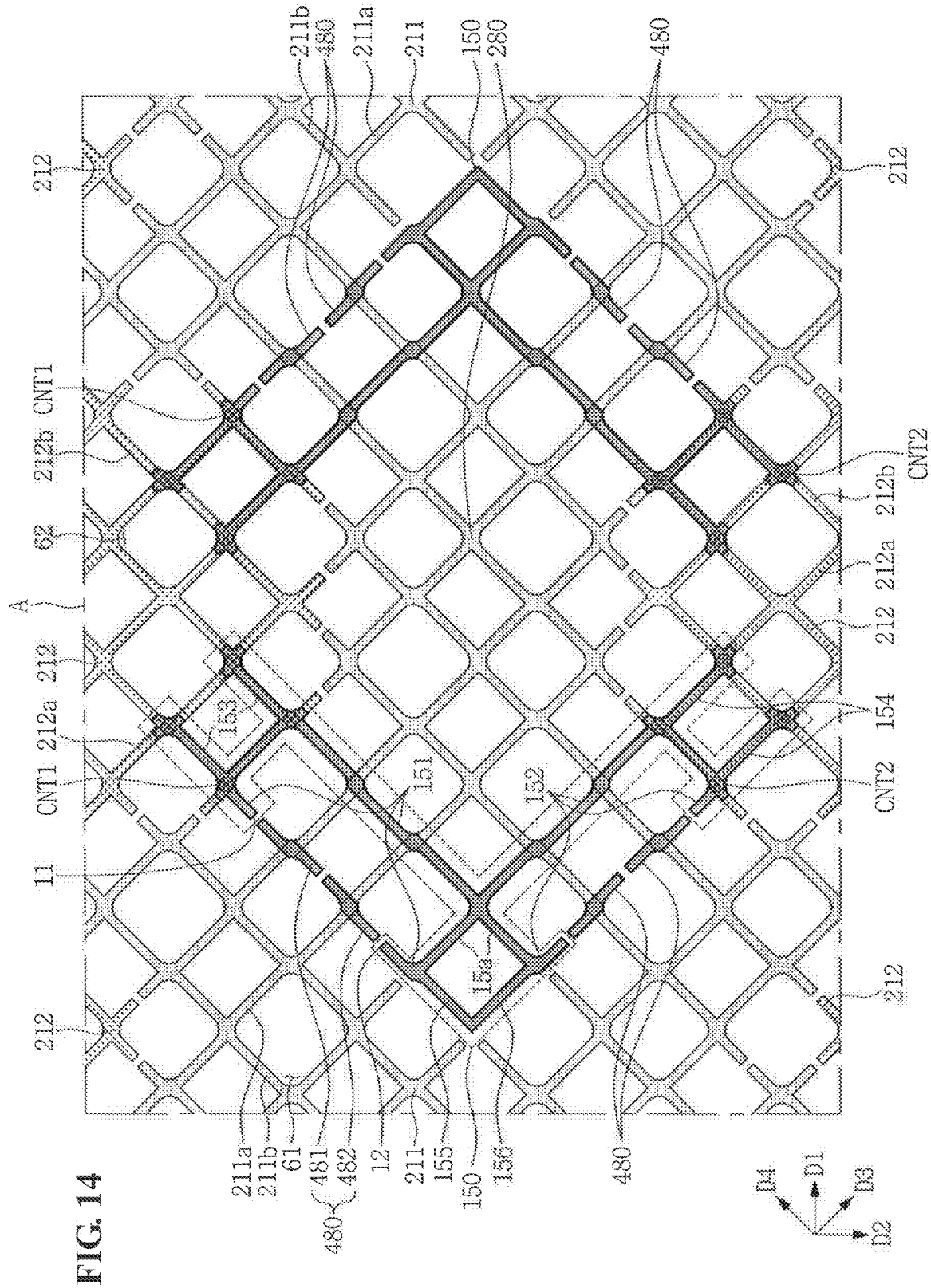
FIG. 14 is a view enlarging part A of FIG. 2 according to another exemplary embodiment of the present invention.

FIG. 14 is a view enlarging part A of FIG. 2 according to another exemplary embodiment of the present invention.

As illustrated in FIG. 14, the dummy electrode 480 is disposed in a non-continuous line shape between the opposing end portions 11 and 12 of the connection electrode 150. In other words, a plurality of dummy electrodes 480 that are separated from each other may be located between the end portions 11 and 12.

The dummy electrode 480 may include a first dummy electrode 481 and a second dummy electrode 482 separated from each other.

One of two adjacent first sensing lines 211a intersects the first dummy electrode 481, and the other of the two adjacent first sensing lines 211a intersects the second dummy electrode 482.

The description of the remaining configurations of FIG. 14 is substantially the same as that described with reference to FIGS. 3 to 10.

Figure 15:
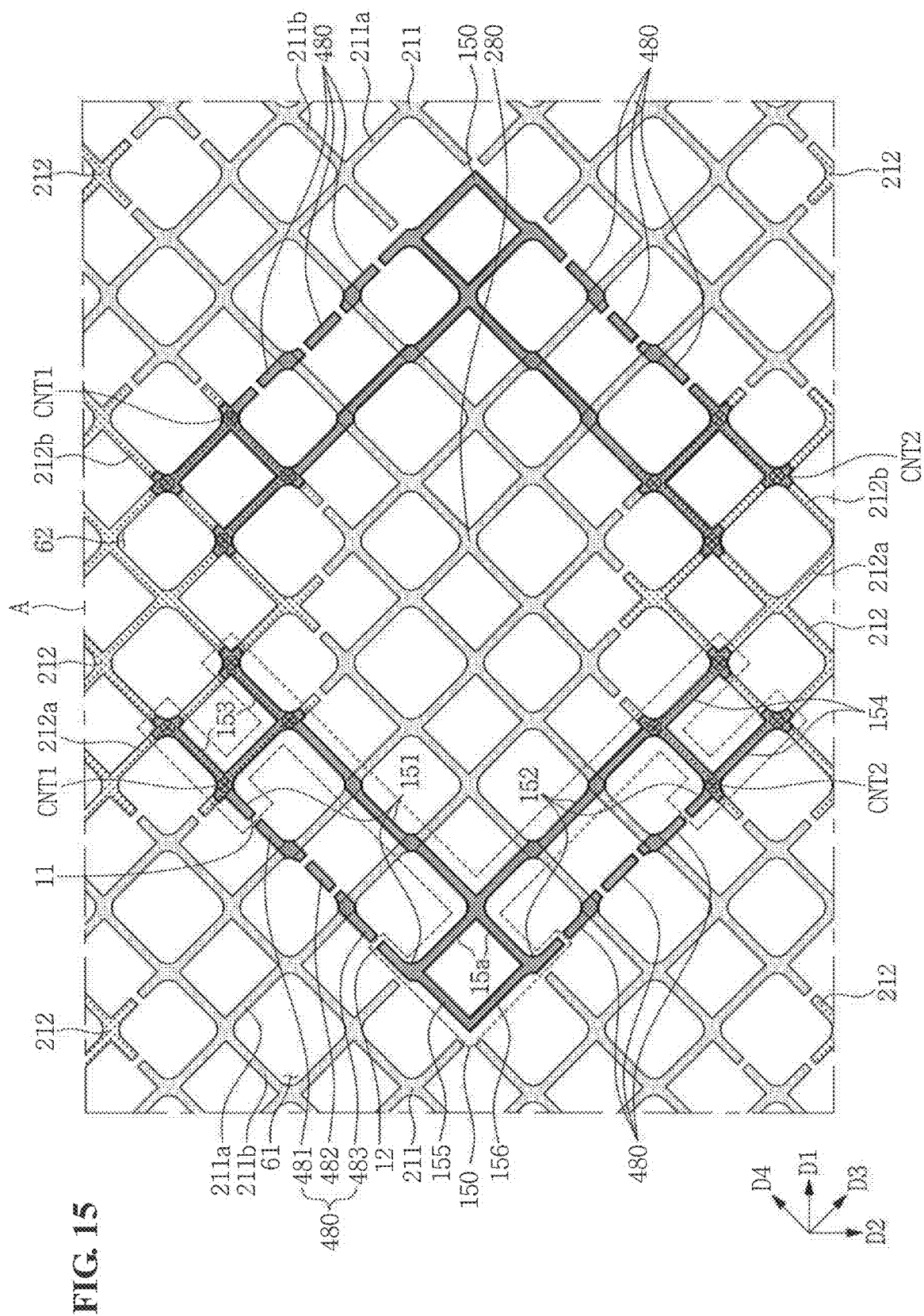
FIG. 15 is a view enlarging part A of FIG. 2 according to another exemplary embodiment of the present invention.

FIG. 15 is a view enlarging part A of FIG. 2 according to another exemplary embodiment of the present invention.

As illustrated in FIG. 15, the dummy electrode 480 is disposed in a non-continuous line shape between the opposing end portions 11 and 12 of the connection electrode 150. In other words, a plurality of dummy electrodes 480 that are separated from each other may be located between the end portions 11 and 12.

The dummy electrode 480 may include a first dummy electrode 481, a second dummy electrode 482, and a third dummy electrode 483 separated from each other.

One of two adjacent first sensing lines 211a intersects the first dummy electrode 481, and the other of the two adjacent first sensing lines 211a intersects the third dummy electrode 483.

The second dummy electrode 482 is located between the first dummy electrode 481 and the third dummy electrode 483. The second dummy electrode 482 may be smaller than the first dummy electrode 481 or the third dummy electrode 483.

Although three dummy electrodes 480 are illustrated as an example in FIG. 15, more than three dummy electrodes may be disposed between the end portions 11 and 12, for example, four separated dummy electrodes may be disposed between the end portions 11 and 12.

The description of the remaining configurations of FIG. 15 is substantially the same as that described with reference to FIGS. 3 to 10.

Figure 16:
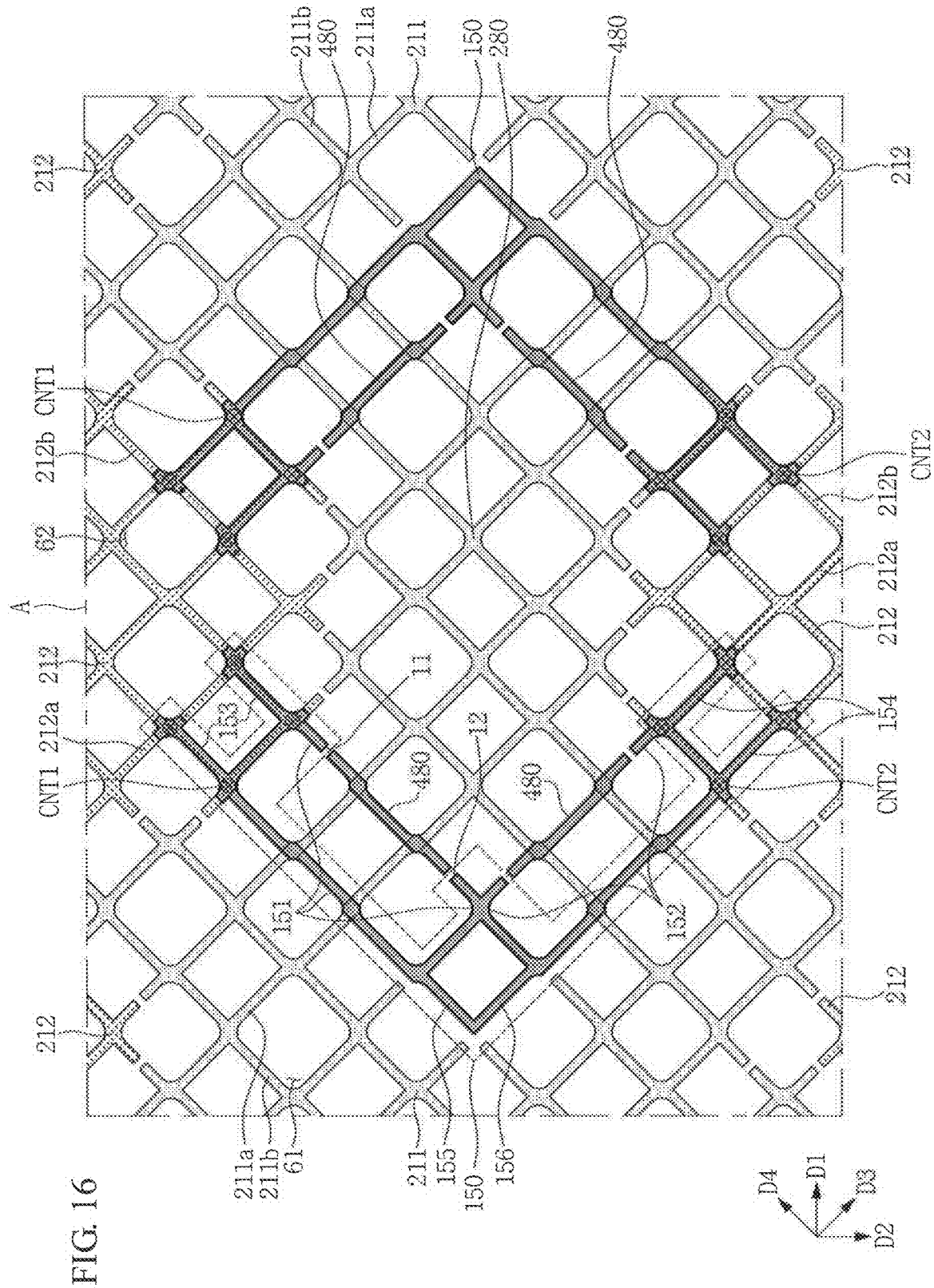
FIG. 16 is a view enlarging part A of FIG. 2 according to another exemplary embodiment of the present invention.

FIG. 16 is a view enlarging part A of FIG. 2 according to another exemplary embodiment of the present invention.

The opposing end portions 11 and 12 of the connection electrode 150 of FIG. 16 are located closer to a center portion of the connection portion 280 than the opposing end portions 11 and 12 of the connection electrode 150 of FIG. 4.

In this configuration, the dummy electrode 480 of FIG. 16 is located closer to a center portion of the connection portion 280 than the dummy electrode 480 of FIG. 4.

The description of the remaining configuration of FIG. 16 is substantially the same as that described with reference to FIG. 3 and FIG. 10.

Figure 17:
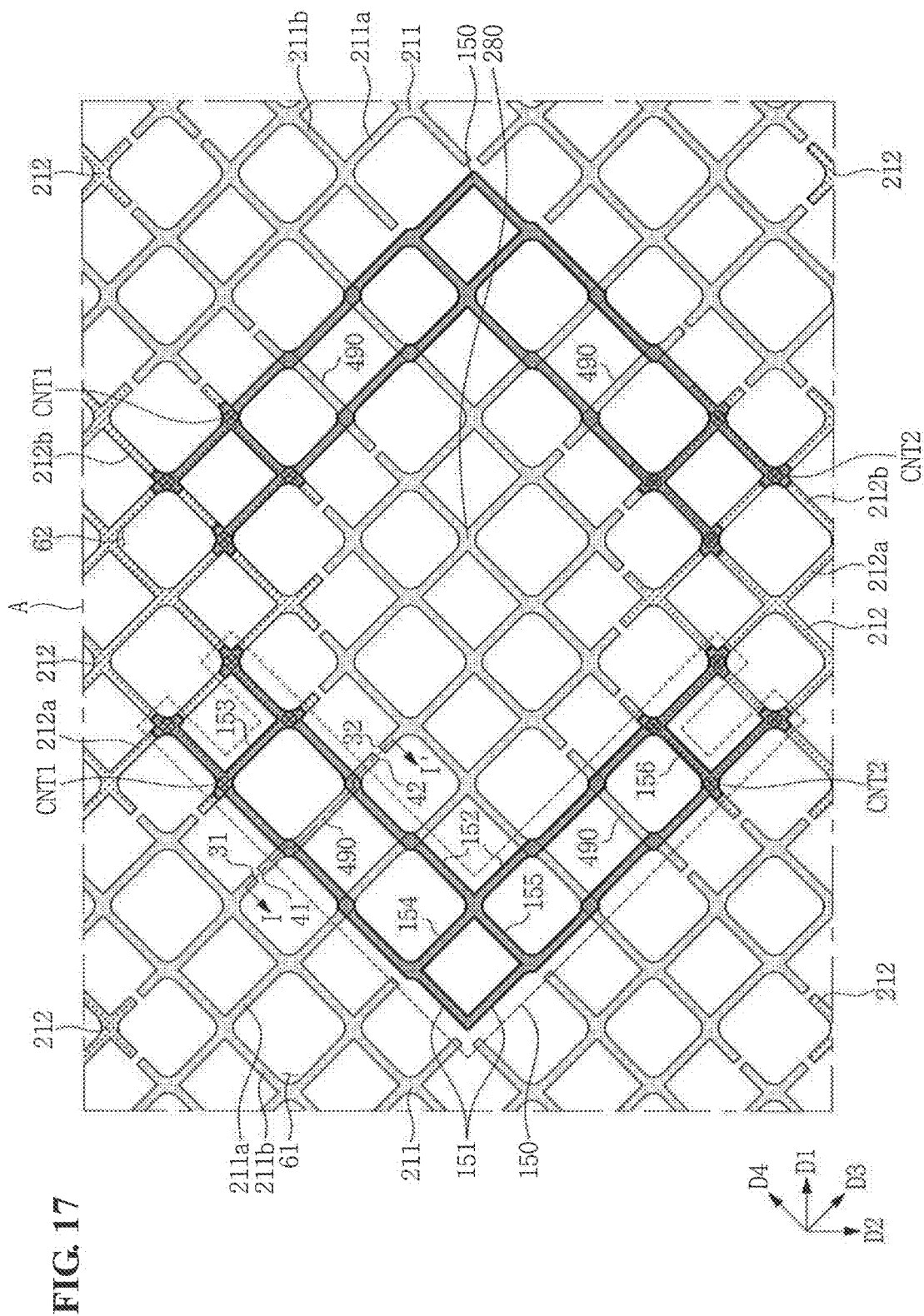
FIG. 17 is a view enlarging part A of FIG. 2 according to another exemplary embodiment of the present invention.
Figure 18:
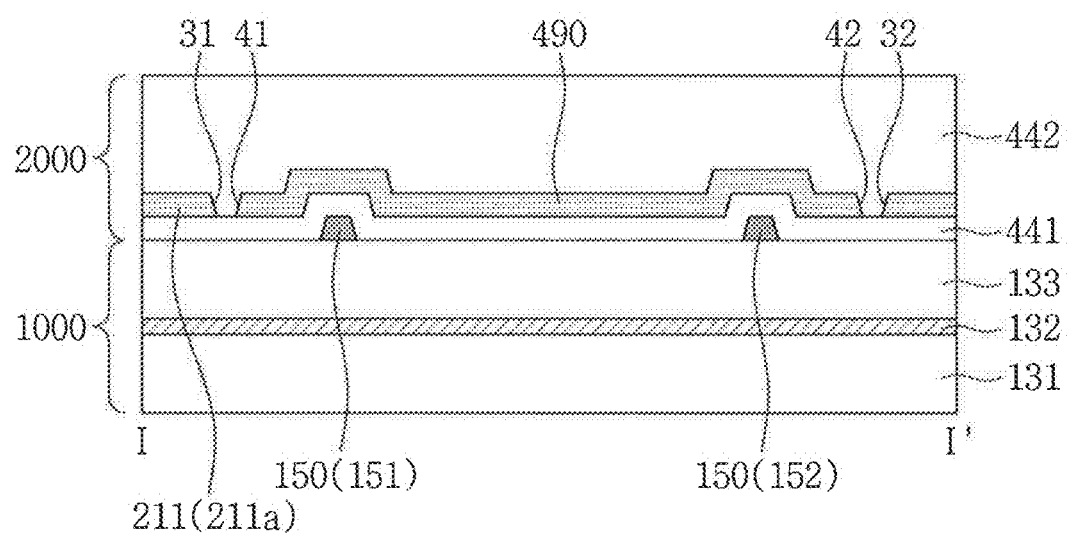
FIG. 18 is a cross-sectional view taken along line I-I' of FIG. 17 according to an exemplary embodiment of the present invention.

FIG. 17 is a view enlarging part A of FIG. 2 according to another exemplary embodiment of the present invention, and FIG. 18 is a cross-sectional view taken along line I-I' of FIG. 17 according to an exemplary embodiment of the present invention.

As illustrated in FIGS. 17 and 18, the connection electrode 150 includes a first connection line 151 and a second connection line 152. In addition, the connection electrode 150 may further include a third connection line 153, a fourth connection line 154, a fifth connection line 155, and a sixth connection line 156.

The first to sixth connection lines 151 to 156 are integrally formed in a single unitary structure.

The first connection line 151 may have an L-like shape or a "<"-like shape. The first connection line 151 overlaps the first sensing electrode 211 and adjacent second sensing electrodes 212. One side of the first connection line 151 is connected to the second sensing electrode 212 on the upper side of FIG. 17 through the first contact hole CNT1 of the first insulating layer 441, and another side of the first connection line 151 is connected to the second sensing electrode 212 on the lower side of FIG. 17 through the second contact hole CNT2 of the first insulating layer 441.

The second connection line 152 may have an L-like shape or a "<"-like shape. The second connection line 152 overlaps the first sensing electrode 211 and adjacent second sensing electrodes 212. One side of the second connection line 152 is connected to the second sensing electrode 212 on the upper side of FIG. 17 through the first contact hole CNT1 of the first insulating layer 441, and another side of the second connection line 152 is connected to the second sensing electrode 212 on the lower side of FIG. 17 through the second contact hole CNT2 of the first insulating layer 441.

The third connection line 153 may be located between the first connection line 151 and the second connection line 152. The third connection line 153 may have an I-like shape, or a line shape. The third connection line 153 overlaps the second sensing electrode 212 on the upper side of FIG. 17. The third connection line 153 is connected to the first connection line 151 and the second connection line 152.

The fourth connection line 154 may be located between the first connection line 151 and the second connection line 152. The fourth connection line 154 may have an I-like shape, or a line shape. The fourth connection line 154 is connected to the first connection line 151 and the second connection line 152.

The fifth connection line 155 may be located between the first connection line 151 and the second connection line 152. The fifth connection line 155 may have an I-like shape, or a line shape. The fifth connection line 155 is connected to the first connection line 151, the second connection line 152 and the fourth connection line 154.

The sixth connection line 156 may be located between the first connection line 151 and the second connection line 152. The sixth connection line 156 may have an I-like shape, or a line shape. The sixth connection line 156 overlaps the second sensing electrode 212 on the lower side of FIG. 17. The sixth connection line 156 is connected to the first connection line 151 and the second connection line 152.

A dummy electrode 490 is located between opposing end portions 31 and 32 of the first sensing electrode 211. For example, the dummy electrode 490 is located between opposing end portions 31 and 32 of the first sensing line 211a.

The dummy electrode 490 may have a line shape extending in the third direction D3.

The dummy electrode 490 intersects the connection electrode 150. For example, the dummy electrode 480 intersects at least one of the first connection line 151 and the second connection line 152 of the connection electrode 150.

As illustrated in FIG. 18, the dummy electrode 490 is located on a substantially same layer as a layer on which the first sensing electrode 211 is located. The dummy electrode 490 may include a material substantially the same as a material included in the first sensing electrode 211.

The dummy electrode 490 is not physically connected to the first sensing electrodes 211, the second sensing electrodes 212, and the connection electrodes 150. In other words, the dummy electrode 490 may be in a floating state or may be a floating electrode having such a state.

Opposing end portions 41 and 31 or 42 and 32 of the dummy electrode 490 and the first sensing electrode 211 may have any one of the shapes illustrated in FIGS. 7 to 10 described above.

A portion of the first insulating layer 441 located at the intersection between the dummy electrode 490 and the connection electrode 150 may be damaged, thereby short-circuiting the dummy electrode 490 and the connection electrode 150. In this case, the dummy electrode 490 functions as a signal line, which is no longer a floating electrode. In other words, the dummy electrode 490 functions as the connection electrode 150. In such an embodiment, a horizontal capacitor may be formed between opposing end portions of the dummy electrode 490 and the first sensing electrode 211, and when the end portions of the dummy electrode 490 and the first sensing electrode 211 have the shape illustrated in FIGS. 9 and 10, the capacitance of the horizontal capacitor may increase. The increase in the capacitance of the horizontal capacitor contributes to the enhancement of the sensitivity of the touch sensing unit 2000.

The dummy electrode 490 may also intersect one of the first connection line 151 and the second connection line 152 that are adjacent to each other.

The dummy electrode 490 may also be located between the first connection line 151 and the second connection line 152 that are adjacent to each other.

In addition, the dummy electrode 490 may be disposed in a non-continuous line shape between the opposing end portions 31 and 32 of the first sensing electrode 211. In other words, a plurality of dummy electrodes 490 that are separated from each other may be arranged in a floating state between the end portions 31 and 32.

Figure 19:
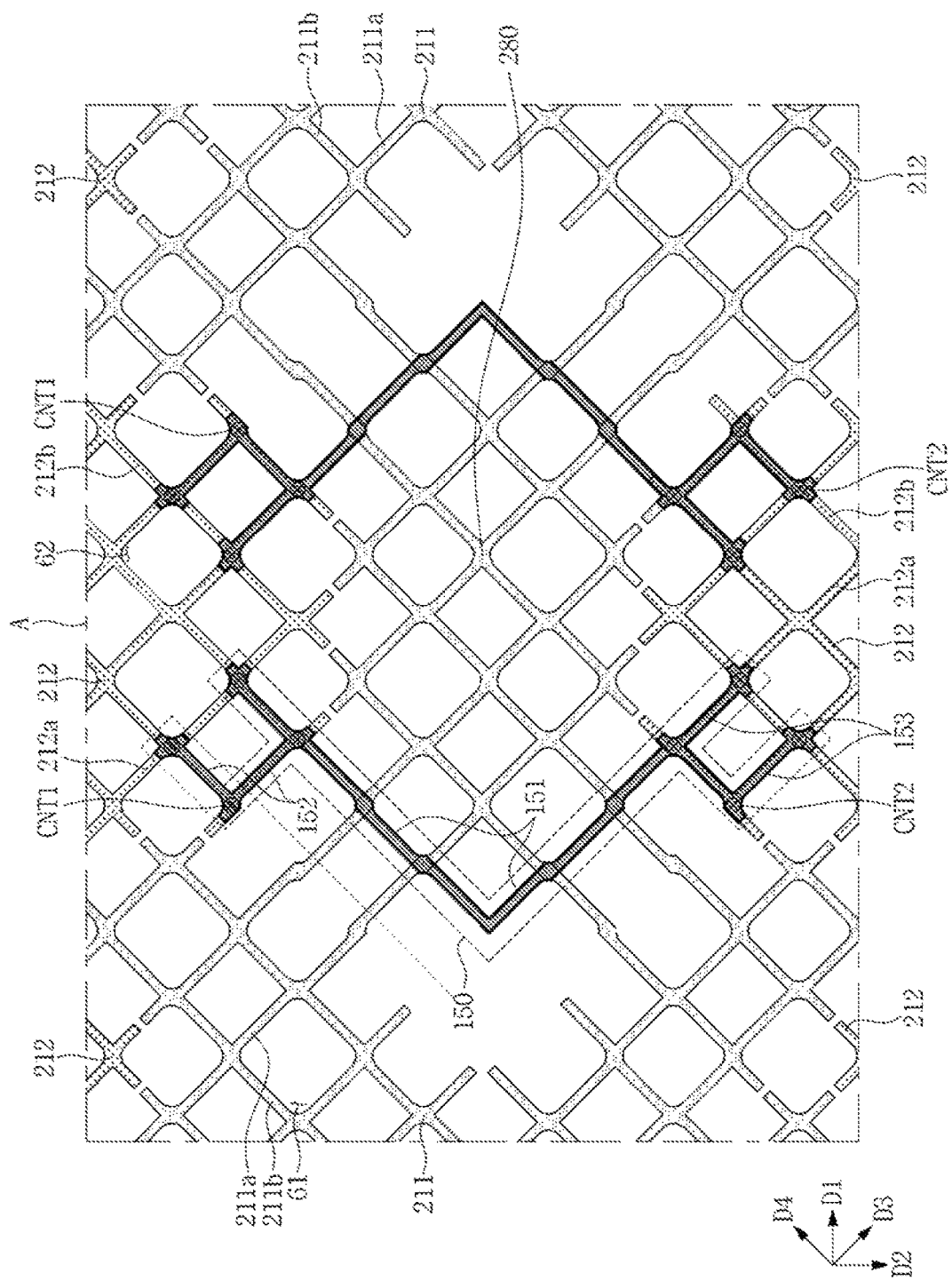
FIG. 19 is a view enlarging part A of FIG. 2 according to another exemplary embodiment of the present invention.

FIG. 19 is a view enlarging part A of FIG. 2 according to another exemplary embodiment of the present invention.

As illustrated in FIG. 19, the connection electrode 150 is connected to the second sensing electrode 212 on the upper side of FIG. 19 through the first contact hole CNT1 of the first insulating layer 441, and is connected to the second sensing electrode 212 on the lower side of FIG. 19 through the second contact hole CNT2 of the first insulating layer 441.

The connection electrode 150 may include the first connection line 151, the second connection line 152, and the third connection line 153.

The first connection line 151 may have an L-like shape or a "<"-like shape. The first connection line 151 overlaps the first sensing electrode 211 and adjacent second sensing electrodes 212. The first connection line 151 is connected to the second sensing electrode 212 on the upper side of FIG. 19 through the first contact hole CNT1, and is connected to the second sensing electrode 212 on the lower side of FIG. 19 through the second contact hole CNT2.

The second connection line 152 extends from one side of the first connection line 151. The second connection line 152 may have an L-like shape or a "<"-like shape. The second connection line 152 overlaps the second sensing electrode 212 on the upper side of FIG. 19. The second connection line 152 is connected to the second sensing electrode 212 on the upper side of FIG. 19 through the first contact hole CNT1.

The third connection line 153 extends from another side of the first connection line 151. The third connection line 153 may have an L-like shape or a "<"-like shape. The third connection line 153 overlaps the second sensing electrode 212 on the lower side of FIG. 19. The third connection line 153 is connected to the second sensing electrode 212 on the lower side of FIG. 19 through the second contact hole CNT2.

The connection electrode 150 of FIG. 19 has an area less than the area of the connection electrode 150 of other embodiments of the present invention. Accordingly, the number of intersections between the connection electrode 150 and the first sensing electrode 211 of FIG. 19 may be reduced. Accordingly, a short-circuit failure between the connection electrode 150 and the first sensing electrode 211 may be minimized.

In an exemplary embodiment of the present invention, in order to increase visibility, the first sensing line 211a and the second sensing line 211b may be further disposed in a portion of FIG. 19 corresponding to the first connection line 151 of FIG. 17.

Figure 20:
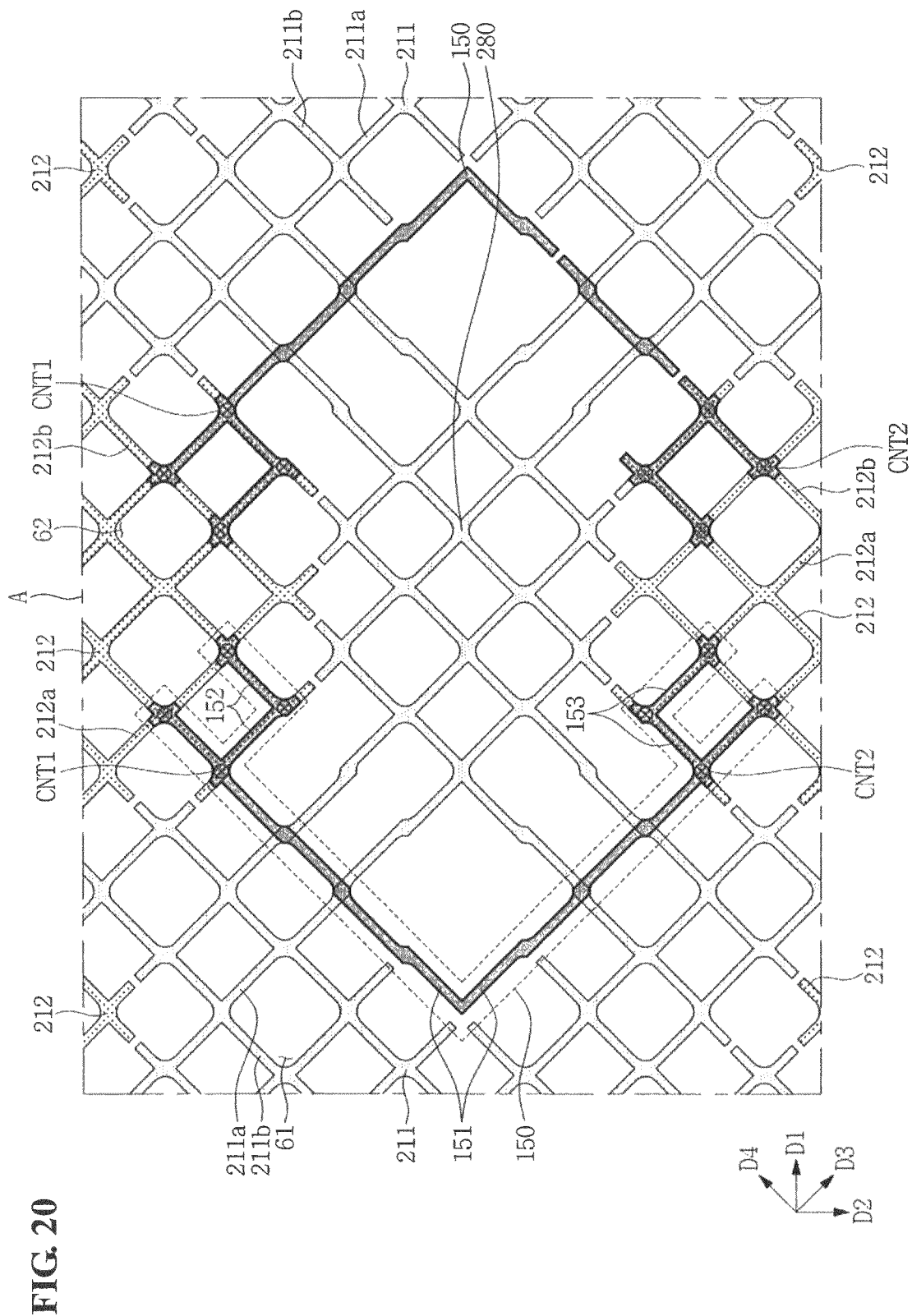
FIG. 20 is a view enlarging part A of FIG. 2 according to another exemplary embodiment of the present invention.

FIG. 20 is a view enlarging part A of FIG. 2 according to another exemplary embodiment of the present invention.

As illustrated in FIG. 20, the connection electrode 150 is connected to the second sensing electrode 212 on the upper side of FIG. 20 through the first contact hole CNT1 of the first insulating layer 441, and is connected to the second sensing electrode 212 on the lower side of FIG. 20 through the second contact hole CNT2 of the first insulating layer 441.

The connection electrode 150 may include the first connection line 151, the second connection line 152, and the third connection line 153.

The first connection line 151 may have an L-like shape or a "<"-like shape. The first connection line 151 overlaps the first sensing electrode 211 and adjacent second sensing electrodes 212. The first connection line 151 is connected to the second sensing electrode 212 on the upper side of FIG. 20 through the first contact hole CNT1, and is connected to the second sensing electrode 212 on the lower side of FIG. 20 through the second contact hole CNT2.

The second connection line 152 extends from one side of the first connection line 151. The second connection line 152 may have an L-like shape or a V-like shape. The second connection line 152 overlaps the second sensing electrode 212 on the upper side of FIG. 20. The second connection line 152 is connected to the second sensing electrode 212 on the upper side of FIG. 20 through the first contact hole CNT1.

The third connection line 153 extends from another side of the first connection line 151. The third connection line 153 may have an L-like shape or a "^"-like shape. The third connection line 153 overlaps the second sensing electrode 212 on the lower side of FIG. 20. The third connection line 153 is connected to the second sensing electrode 212 on the lower side of FIG. 20 through the second contact hole CNT2.

The connection electrode 150 of FIG. 20 has an area less than the area of the connection electrode 150 of other embodiments of the present invention. Accordingly, the number of intersections between the connection electrode 150 and the first sensing electrode 211 of FIG. 20 may be reduced. Accordingly, a short-circuit failure between the connection electrode 150 and the first sensing electrode 211 may be minimized.

In an exemplary embodiment of the present invention, to increase visibility, the first sensing line 211a and the second sensing line 211b may be further disposed in a portion of FIG. 20 corresponding to the first connection line 151 of FIG. 17.

As set forth hereinabove, the display device according to one or more exemplary embodiments of the present invention provides the following effects.

First, the number of intersections between the connection electrode and the first sensing electrode may be reduced through the use of the dummy electrode in a floating state. Accordingly, a short-circuit failure between the connection electrode and the first sensing electrode may be minimized. Accordingly, a short-circuit failure in which the first sensing electrode and the second sensing electrode are connected to each other by the connection electrode may be minimized.

Second, the dummy electrode is located close to the connection electrode, between end portions of the connection electrode, and thus, the dummy electrode may be visually recognized as a part of the connection electrode. Accordingly, a short-circuit failure between the connection electrode and the first sensing electrode may be minimized without a visibility issue.

Third, the area of the connection electrode contacting the first contact hole and the second contact hole barely changes, and the contact resistance between the connection electrode and the second sensing electrodes barely increases.

Fourth, since the end portions of the dummy electrode and the connection electrode have a rounded shape or a concavo-convex shape, the capacitance of the capacitor may increase. In addition, the cracking of the end portions of the dummy electrode and the connection electrode may be minimized.

While the present invention has been illustrated and described with reference to the exemplary embodiments thereof, it will be apparent to those of ordinary skill in the art that various changes in form and detail may be made thereto without departing from the spirit and scope of the present invention as defined by the following claims.

What is claimed is:

1. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to at least one of the second sensing electrodes through a contact hole of the insulating layer; and
a dummy electrode located on the same layer as the connection electrode, wherein the dummy electrode is not physically connected to the connection electrode and the first sensing electrodes,
wherein the dummy electrode is located between end portions of the connection electrode.

2. The display device of claim 1, wherein the dummy electrode is a floating electrode.

3. The display device of claim 1, wherein an end portion of the dummy electrode faces an end portion of the end portions of the connection electrode.

4. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to at least one of the second sensing electrodes throw a contact hole of the insulating layer; and
a dummy electrode located on the same layer as the connection electrode, wherein the dummy electrode is not physically connected to the connection electrode and the first sensing electrodes,
wherein an end portion of the dummy electrode faces an end portion of the connection electrode,
wherein the end portions of the dummy electrode and the connection electrode have a rounded shape.

5. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to at least one of the second sensing electrodes through a contact hole of the insulating layer; and a dummy electrode located on the same layer as the connection electrode wherein, the dummy electrode is not physically connected to the connection electrode and the first sensing electrodes, wherein an end portion of the dummy electrode faces an end portion of the connection electrode, wherein the end portions of the dummy electrode and the connection electrode have a rounded shape protruding toward each other.

6. A display device, comprising:

a display panel comprising a substrate; and a touch sensing unit on the substrate, wherein the touch sensing unit comprises;

a plurality of first sensing electrodes disposed on the substrate and directly connected to each other;

a plurality of second sensing electrodes disposed on the substrate;

an insulating layer between the substrate and the first sensing electrodes and between the substrate and the second sensing electrodes;

a connection electrode disposed between the substrate and the insulating layer, wherein the connection electrode is connected to at least one of the second sensing electrodes through a contact hole of the insulating layer; and a dummy electrode located on the same layer as the connection electrode, wherein the dummy electrode is not physically connected to the connection electrode and the first sensing electrodes, wherein an end portion of the dummy electrode faces an end portion of the connection electrode, wherein one of the end portions of the dummy electrode and the connection electrode has a rounded shape protruding toward the other of the end portions, and the other of the end portions has a concave shape.

7. A display device, comprising:

a display panel comprising a substrate; and a touch sensing unit on the substrate, wherein the touch sensing unit comprises:

a plurality of first sensing electrodes disposed on the substrate and directly connected to each other;

a plurality of second sensing electrodes disposed on the substrate;

an insulating layer between the substrate and the first sensing electrodes and between the substrate and the second sensing electrodes;

a connection electrode disposed between the substrate and the insulating layer, wherein the connection electrode is connected to at least one of the second sensing electrodes through a contact hole of the insulating layer; and a dummy electrode located on the same layer as the connection electrode, wherein the dummy electrode is not physically connected to the connection electrode and the first sensing electrodes, wherein an end portion of the dummy electrode faces an end portion of the connection electrode, wherein the end portions of the dummy electrode and the connection electrode have concavo-convex shapes or zig-zag shapes.

8. The display device of claim 1, wherein the dummy electrode is adjacent to the connection electrode.

9. A display device, comprising:

a display panel comprising a substrate; and a touch sensing unit on the substrate, wherein the touch sensing unit comprises:

a plurality of first sensing electrodes disposed on the substrate and directly connected to each other;

a plurality of second sensing electrodes disposed on the substrate;

an insulating layer between the substrate and the first sensing electrodes and between the substrate and the second sensing electrodes;

a connection electrode disposed between the substrate and the insulating layer, wherein the connection electrode is connected to at least one of the second sensing electrodes through a contact hole of the insulating layer; and a dummy electrode located on the same layer as the connection electrode, wherein the dummy electrode is not physically connected to the connection electrode and the first sensing electrodes, wherein the dummy electrode is located between adjacent second sensing electrodes.

10. A display device, comprising:

a display panel comprising a substrate; and a touch sensing unit on the substrate, wherein the touch sensing unit comprises:

a plurality of first sensing electrodes disposed on the substrate and directly connected to each other;

a plurality of second sensing electrodes disposed on the substrate;

an insulating layer between the substrate and the first sensing electrodes and between the substrate and the second sensing electrodes;

a connection electrode disposed between the substrate and the insulating layer, wherein the connection electrode is connected to at least one of the second sensing electrodes through a contact hole of the insulating layer; and a dummy electrode located on the same layer as the connection electrode, wherein the dummy electrode is not physically connected to the connection electrode and the first sensing electrodes, wherein end portions of the dummy electrode and the connection electrode are located between one of the first sensing electrodes and one of the second sensing electrodes.

11. The display device of claim 10, wherein other end portions of the dummy electrode and the connection electrode are located in a hole of the one first sensing electrode.

12. The display device of claim 1, wherein the dummy electrode overlaps at least one of the plurality of first sensing electrodes.

13. A display device, comprising:

a display panel comprising a substrate; and a touch sensing unit on the substrate, wherein the touch sensing unit comprises:

a plurality of first sensing electrodes disposed on the substrate and directly connected to each other;

a plurality of second sensing electrodes disposed on the substrate;

an insulating layer between the substrate and the first sensing electrodes and between the substrate and the second sensing electrodes;

a connection electrode disposed between the substrate and the insulating layer, wherein the connection electrode is connected to at least one of the second sensing electrodes through a contact hole of the insulating layer; and a dummy electrode located on the same layer as the connection electrode wherein, the dummy electrode is not physically connected to the connection electrode and the first sensing electrodes, wherein the dummy electrode does not overlap the plurality of first sensing electrodes.

14. The display device of claim 1, wherein the dummy electrode is not physically connected to the plurality of first sensing electrodes.

15. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to at least one of the second sensing electrodes through a contact hole of the insulating layer; and
a dummy electrode located on the same layer as the connection electrode,
wherein the dummy electrode is connected to at least one of the plurality of first sensing electrodes.

16. The display device of claim 1, wherein the dummy electrode has a non-continuos line shape.

17. The display device of claim 16, wherein the dummy electrode comprises a plurality of dummy electrodes that are separated from each other.

18. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to at least one of the second sensing electrodes through a contact hole of the insulating layer; and
a dummy electrode located on the same layer as the connection electrode wherein, the dummy electrode is not physically connected to the connection electrode and the first sensing electrodes,
wherein the dummy electrode has a non-continuous line shape,
wherein the dummy electrode comprises a plurality of dummy electrodes that are separated from each other,
wherein a sensing line of one of the first sensing electrodes is located between end portions of one of the plurality of dummy electrodes and the connection electrode.

19. The display device of claim 1, wherein the connection electrode overlaps one of the first sensing electrodes and two of the second sensing electrodes that are adjacent to each other.

20. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to one of the second sensing electrodes through a first contact hole of the insulating layer and to another one of the second sensing electrodes through a second contact hole of the insulating layer; and
a dummy electrode located between a third contact hole and a fourth contact hole, wherein the third contact hole is connected to the first contact hole and the fourth contact hole is connected to the second contact hole, and wherein the dummy electrode has a non-continuous line shape.

21. A display device, comprising:
a display panel comprising a substrate; and
a touch sensing unit on the substrate,
wherein the touch sensing unit comprises:
a plurality of first sensing electrodes disposed on the substrate and directly connected to each other;
a plurality of second sensing electrodes disposed on the substrate;
an insulating layer between the substrate and the first sensing electrodes and between the substrate and the second sensing electrodes;
a connection electrode disposed between the substrate and the insulating layer, wherein the connection electrode is connected to adjacent second sensing electrodes through a contact hole of the insulating layer; and
a dummy electrode located on the same layer as the first sensing electrodes, wherein the dummy electrode intersects the connection electrode, and is not physically connected to the first sensing electrodes and the second sensing electrodes.

22. The display device of claim 21, wherein the dummy electrode is a floating electrode.

23. The display device of claim 21, wherein an end portion of the dummy electrode faces an end portion of the first sensing electrode.

24. The display device of claim 23, wherein the end portions of the dummy electrode and the first sensing electrode have a rounded shape.

25. The display device of claim 21, wherein end portions of the dummy electrode and the connection electrode have a rounded shape protruding toward each other.

26. The display device of claim 21, wherein first end portions of the dummy electrode and the connection electrode have a rounded shape protruding toward second end portions of the dummy electrode and the connection electrode, and the second end portions have a concave shape.

27. The display device of claim 21, wherein end portions of the dummy electrode and the connection electrode have a concavo-convex shape.

* * * * *